US009867147B2

(12) United States Patent
Pelletier et al.

(10) Patent No.: US 9,867,147 B2
(45) Date of Patent: Jan. 9, 2018

(54) METHOD AND APPARATUS FOR TRANSMIT POWER CONTROL FOR MULTIPLE ANTENNA TRANSMISSIONS IN THE UPLINK

(71) Applicant: InterDigital Patent Holdings, Inc., Wilmington, DE (US)

(72) Inventors: Benoit Pelletier, Montreal (CA); Lujing Cai, Morganville, NJ (US); Hong Zhang, Manalapan, NJ (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 247 days.

(21) Appl. No.: 14/708,850

(22) Filed: May 11, 2015

(65) Prior Publication Data

US 2015/0245304 A1 Aug. 27, 2015

Related U.S. Application Data

(63) Continuation of application No. 12/896,668, filed on Oct. 1, 2010, now Pat. No. 9,031,600.

(Continued)

(51) Int. Cl.
*H04B 7/00* (2006.01)
*H04W 52/34* (2009.01)
(Continued)

(52) U.S. Cl.
CPC ............ *H04W 52/34* (2013.01); *H04J 13/00* (2013.01); *H04L 1/1812* (2013.01);
(Continued)

(58) Field of Classification Search
CPC ......... H04W 52/04; H04W 72/04; H04B 7/00
(Continued)

(56) References Cited

U.S. PATENT DOCUMENTS 7,020,110 B2 3/2006 Walton et al.
7,194,286 B2 3/2007 Lozano et al.
(Continued)

FOREIGN PATENT DOCUMENTS

JP 2004-247798 9/2004
WO 2008/088535 7/2008
WO 2009068078 A1 6/2009

OTHER PUBLICATIONS

Ericsson, "Analysis of Introducing Uplink Transmit Diversity," R4-091829, 3GPP TSG-RAN WG4 Meeting #51, San Francisco, CA, USA, May 4-8, 2009.

(Continued)

*Primary Examiner* — Md Talukder
(74) *Attorney, Agent, or Firm* — Volpe and Koenig, P.C.

(57) ABSTRACT

Techniques for transmit power control for multiple antenna transmissions in an uplink are disclosed. A wireless transmit/receive unit (WTRU) generates at least one input stream for transmission and applies a gain factor to each channel. The gain factor is determined based on a reference channel power estimate. The WTRU generates at least two data streams from the input stream for transmission via a plurality of antennas and applies weights to the data streams. The gain factor and/or the weights are controlled such that a transmit power on each antenna is within a maximum allowed value. The WTRU may perform power scaling on a condition that a transmit power on any antenna exceeds the maximum allowed value. The WTRU may scale down an enhanced dedicated channel (E-DCH) dedicated physical data channel (E-DPDCH) first before other channels. For multiple E-DCH streams, the WTRU may calculate an E-DPDCH power offset based on an additional power offset factor due to multiple stream transmission.

10 Claims, 9 Drawing Sheets

Related U.S. Application Data

(60) Provisional application No. 61/248,034, filed on Oct. 2, 2009, provisional application No. 61/247,995, filed on Oct. 2, 2009.

(51) Int. Cl.

| | | |
|---|---|---|
| *H04W 52/36* | (2009.01) | |
| *H04J 13/00* | (2011.01) | |
| *H04L 1/18* | (2006.01) | |
| *H04W 72/04* | (2009.01) | |
| *H04B 7/0413* | (2017.01) | |
| *H04B 7/06* | (2006.01) | |
| *H04W 52/14* | (2009.01) | |
| *H04W 52/42* | (2009.01) | |
| *H04B 7/04* | (2017.01) | |

(52) U.S. Cl.
CPC ..... *H04W 52/367* (2013.01); *H04W 72/0473* (2013.01); *H04B 7/0413* (2013.01); *H04B 7/0465* (2013.01); *H04B 7/0615* (2013.01); *H04W 52/146* (2013.01); *H04W 52/42* (2013.01)

(58) Field of Classification Search
USPC .......... 455/522, 517, 562.1, 127.2, 501, 509
See application file for complete search history.

(56) References Cited

U.S. PATENT DOCUMENTS

| | | | |
|---|---|---|---|
| 7,206,607 B2 | 4/2007 | Kim et al. | |
| 7,408,895 B2* | 8/2008 | Zhang ................. | H04W 52/346 370/318 |
| 7,457,371 B2 | 11/2008 | Atsuta | |
| 7,551,589 B2* | 6/2009 | Kim ...................... | H04L 1/0003 370/326 |
| 7,734,262 B2 | 6/2010 | Akbar Attar et al. | |
| 7,920,889 B2 | 4/2011 | Hoshino et al. | |
| 8,245,092 B2* | 8/2012 | Kotecha ............... | H04L 1/1812 714/748 |
| 8,295,840 B2* | 10/2012 | Ishii ..................... | H04B 7/0654 370/331 |
| 8,792,928 B2 | 7/2014 | Yajima et al. | |
| 8,830,904 B2 | 9/2014 | Kim et al. | |
| 2003/0108013 A1* | 6/2003 | Hwang ............... | H04W 52/146 370/335 |
| 2005/0083943 A1* | 4/2005 | Lee ........................ | H04L 47/10 370/395.4 |
| 2005/0143114 A1 | 6/2005 | Moulsley et al. | |
| 2005/0201474 A1 | 9/2005 | Cho et al. | |
| 2006/0003787 A1 | 1/2006 | Heo et al. | |
| 2006/0166690 A1* | 7/2006 | Nishio ................ | H04W 52/327 455/522 |
| 2006/0262874 A1 | 11/2006 | Shan | |
| 2007/0142074 A1* | 6/2007 | Black ....................... | H01Q 3/24 455/522 |
| 2007/0155335 A1* | 7/2007 | Love ..................... | H04W 52/52 455/69 |
| 2008/0043619 A1* | 2/2008 | Sammour ............. | H04L 1/1685 370/231 |
| 2008/0051045 A1* | 2/2008 | Hwang ................. | H04W 52/143 455/127.2 |
| 2008/0051127 A1* | 2/2008 | Xu ....................... | H04W 52/146 455/522 |
| 2008/0069035 A1* | 3/2008 | Pinheiro ................ | H04L 47/10 370/328 |
| 2008/0107198 A1* | 5/2008 | Jen ........................... | H04B 7/04 375/260 |
| 2008/0194283 A1 | 8/2008 | Chaponniere | |
| 2009/0232239 A1* | 9/2009 | Ko ........................... | H04L 5/005 375/260 |
| 2009/0245209 A1 | 10/2009 | Cho et al. | |
| 2009/0290559 A1* | 11/2009 | Pelletier .................. | H04L 1/189 370/336 |
| 2010/0074131 A1 | 3/2010 | Onggosanusi et al. | |
| 2010/0098012 A1 | 4/2010 | Bala et al. | |
| 2010/0115358 A1* | 5/2010 | Kotecha ................ | H04L 1/1812 714/748 |
| 2010/0290408 A1 | 11/2010 | Steudle et al. | |
| 2010/0317361 A1* | 12/2010 | Hu ......................... | H04W 52/50 455/450 |
| 2011/0044314 A1* | 2/2011 | Calvanese Strinati | H04L 1/1867 370/344 |
| 2011/0053631 A1 | 3/2011 | Bottomley et al. | |
| 2011/0105174 A1* | 5/2011 | Pelletier .............. | H04W 52/367 455/522 |
| 2012/0207045 A1* | 8/2012 | Pelletier ............... | H04B 7/0404 370/252 |
| 2012/0257568 A1* | 10/2012 | Cai ........................ | H04L 1/1614 370/328 |
| 2012/0275403 A1* | 11/2012 | Zhang .................. | H04B 7/0404 370/329 |
| 2012/0281544 A1* | 11/2012 | Anepu ................. | H04B 7/0632 370/241 |
| 2012/0287869 A1* | 11/2012 | Xi ........................... | H04L 5/003 370/329 |
| 2013/0272257 A1 | 10/2013 | Takaoka et al. | |
| 2013/0315180 A1* | 11/2013 | Papasakellariou ...... | H04L 5/001 370/329 |
| 2014/0105141 A1 | 4/2014 | Noh et al. | |
| 2014/0171144 A1 | 6/2014 | Kim et al. | |
| 2015/0245304 A1* | 8/2015 | Pelletier .............. | H04W 52/367 370/335 |

OTHER PUBLICATIONS

Huawei, "2ms/10ms TTI Selection for EUL," 3GPP TSG-RAN WG1 #53, R1-081941 (May 5-9, 2008).

Kim et al., "Proposed Text on Power Control Section for the IEEE 802.16m Amendment," IEEE 802.16 Broadband Wireless Access Working Group, IEEE C802.16m-09/ 0634 (Mar. 2, 2009).

Magnolia Broadband, "Analysis of UE Frequency Error Due to Uplink Beamforming Transmit Diversity in HSPA," R4-091765, 3GPP TSG-RAN WG4 Meeting #51, San Francisco, USA, May 4-8, 2009.

Magnolia Broadband, "Analysis of UE Transmit Power due to Uplink Beamforming Transmit Diversity in HSPA," 3GPP TSG-RAN WG4 Meeting #51, R4-091764 (May 4-8, 2009).

Ran, "Uplink Tx Diversity for HSPA," RP-090987, Sep. 2009.

Third Generation Partnership Project, "3rd Generation Partnership Project; Technical Specification Group Radio Access Network; User Equipment (UE) radio transmission and reception (FDD) (Release 9)," 3GPP TS 25.101 V9.1.0 (Sep. 2009).

Third Generation Partnership Project, "Technical Specification Group Radio Access Network; Physical Layer—Measurements (FDD) (Release 8)," 3GPP TS 25.215 v8.4.0, Sep. 2009.

Third Generation Partnership Project, "Technical Specification Group Radio Access Network; Physical Layer—Measurements (FDD) (Release 9)," 3GPP TS 25.215 v9.0.0, Sep. 2009.

Third Generation Partnership Project, "Technical Specification Group Radio Access Network; Physical Layer—Measurements (FDD) (Release 9)," 3GPP TS 25.215 v9.2.0, Mar. 2010.

Third Generation Partnership Project, "Technical Specification Group Radio Access Network; Physical Layer Procedures (FDD) (Release 7)," 3GPP TS 25.214 v7.13.0, Sep. 2009.

Third Generation Partnership Project, "Technical Specification Group Radio Access Network; Physical Layer Procedures (FDD) (Release 7)," 3GPP TS 25.214 v7.15.0, Mar. 2010.

Third Generation Partnership Project, "Technical Specification Group Radio Access Network; Physical Layer Procedures (FDD) (Release 8)," 3GPP TS 25.214 v8.7.0, Sep. 2009.

Third Generation Partnership Project, "Technical Specification Group Radio Access Network; Physical Layer Procedures (FDD) (Release 8)," 3GPP TS 25.214 v8.9.0, Mar. 2010.

(56) References Cited

OTHER PUBLICATIONS

Third Generation Partnership Project, "Technical Specification Group Radio Access Network; Physical Layer Procedures (FDD) (Release 9)," 3GPP TS 25.214 v9.0.0, Sep. 2009.
Third Generation Partnership Project, "Technical Specification Group Radio Access Network; Physical Layer Procedures (FDD) (Release 9)," 3GPP TS 25.214 v9.2.0, Mar. 2010.
Third Generation Partnership Project, "Technical Specification Group Radio Access Network; Requirements for Support of Radio Resource Management (FDD) (Release 7)," 3GPP TS 25.133 v7.15.0, Sep. 2009.
Third Generation Partnership Project, "Technical Specification Group Radio Access Network; Requirements for Support of Radio Resource Management (FDD) (Release 8)," 3GPP TS 25.133 v8.8.0, Sep. 2009.
Third Generation Partnership Project, "Technical Specification Group Radio Access Network; Requirements for Support of Radio Resource Management (FDD) (Release 8)," 3GPP TS 25.133 v8.11.0, Jun. 2010.
Third Generation Partnership Project, "Technical Specification Group Radio Access Network; Requirements for Support of Radio Resource Management (FDD) (Release 9)," 3GPP TS 25.133 v9.1.0, Sep. 2009.
Third Generation Partnership Project, "Technical Specification Group Radio Access Network; Requirements for Support of Radio Resource Management (FDD) (Release 9)," 3GPP TS 25.133 v9.4.0, Jun. 2010.
Third Generation Partnership Project, "Technical Specification Group Radio Access Network; Spreading and Modulation (FDD) (Release 8)," 3GPP TS 25.213 v8.4.0, Mar. 2009.
Third Generation Partnership Project, "Technical Specification Group Radio Access Network; Spreading and Modulation (FDD) (Release 8)," 3GPP TS 25.213 v8.5.0, Dec. 2009.
Third Generation Partnership Project, "Technical Specification Group Radio Access Network; Spreading and Modulation (FDD) (Release 9)," 3GPP TS 25.213 v9.0.0, Sep. 2009.
Third Generation Partnership Project, "Technical Specification Group Radio Access Network; Spreading and Modulation (FDD) (Release 9)," 3GPP TS 25.213 v9.1.0, Dec. 2009.
Third Generation Partnership Project, "Technical Specification Group Radio Access Network; User Equipment (UE) radio transmission and reception (FDD) (Release 9)," 3GPP TS 25.101 V9.0.0 (May 2009).
Third Generation Partnership Project, "Technical Specification Group Radio Access Network; User Equipment (UE) radio transmission and reception (FDD) (Release 8)," 3GPP TS 25.101 V8.12.0 (Sep. 2010).
Third Generation Partnership Project, "Technical Specification Group Radio Access Network; User Equipment (UE) radio transmission and reception (FDD) (Release 9)," 3GPP TS 25.101 V9.5.0 (Sep. 2010).
Third Generation Partnership Project, "Technical Specification Group Radio Access Network; User Equipment (UE) radio transmission and reception (FDD) (Release 7)," 3GPP TS 25.101 V7.16.0 (May 2009).
Third Generation Partnership Project, "Technical Specification Group Radio Access Network; User Equipment (UE) radio transmission and reception (FDD) (Release 7)," 3GPP TS 25.101 V7.18.0 (Sep. 2010).
Third Generation Partnership Project, "Technical Specification Group Radio Access Network; User Equipment (UE) radio transmission and reception (FDD) (Release 6)," 3GPP TS 25.101 V6.19.0 (Mar. 2009).
Third Generation Partnership Project, "Technical Specification Group Radio Access Network; User Equipment (UE) radio transmission and reception (FDD) (Release 8)," 3GPP TS 25.101 V8.8.0 (Sep. 2009).
Third Generation Partnership Project, "Technical Specification Group Radio Access Network; Evolved Universal Terrestrial Radio Access (E-UTRA); Physical layer procedures (Release 8)," 3GPP TS 36.213 V8.8.0 (Sep. 2009).
Third Generation Partnership Project, "Technical Specification Group Radio Access Network; Evolved Universal Terrestrial Radio Access (E-UTRA); Physical layer procedures (Release 9)," 3GPP TS 36.213 V9.2.0 (Jun. 2010).
Third Generation Partnership Project, "Technical Specification Group Radio Access Network; Physical channels and mapping of transport channels onto physical channels (FDD) Release 6)," 3GPP TS 25.211 V6.10.0 (Sep. 2009).
Third Generation Partnership Project, "Technical Specification Group Radio Access Network; Physical channels and mapping of transport channels onto physical channels (FDD) (Release 7)," 3GPP TS 25.211 V7.8.0 (Sep. 2009).
Third Generation Partnership Project, "Technical Specification Group Radio Access Network; Physical channels and mapping of transport channels onto physical channels (FDD)(Release 7)," 3GPP TS 25.211 V7.9.0 (Dec. 2009).
Third Generation Partnership Project, "Technical Specification Group Radio Access Network; Physical channels and mapping of transport channels onto physical channels (FDD) (Release 8)," 3GPP TS 25.211 V8.5.0 (Sep. 2009).
Third Generation Partnership Project, "Technical Specification Group Radio Access Network; Physical channels and mapping of transport channels onto physical channels (FDD) (Release 8)," 3GPP TS 25.211 V8.6.0 (Dec. 2009).
Third Generation Partnership Project, "Technical Specification Group Radio Access Network; Physical channels and mapping of transport channels onto physical channels (FDD) (Release 9)," 3GPP TS 25.211 V9.0.0 (Sep. 2009).
Third Generation Partnership Project, "Technical Specification Group Radio Access Network; Physical channels and mapping of transport channels onto physical channels (FDD) (Release 9)," 3GPP TS 25.211 V9.1.0 (Dec. 2009).
Third Generation Partnership Project, "Technical Specification Group Radio Access Network; Enhanced uplink; Overall description; Stage 2 (Release 7)," 3GPP TS 25.319 V7.7.0 (Jun. 2009).
Third Generation Partnership Project, "Technical Specification Group Radio Access Network; Enhanced uplink; Overall description; Stage 2 (Release 7)," 3GPP TS 25.319 V7.8.0 (Dec. 2009).
Third Generation Partnership Project, "Technical Specification Group Radio Access Network; Enhanced uplink; Overall description; Stage 2 (Release 8)," 3GPP TS 25.319 V8.7.0 (Sep. 2009).
Third Generation Partnership Project, "Technical Specification Group Radio Access Network; Enhanced uplink; Overall description; Stage 2 (Release 8)," 3GPP TS 25.319 V8.10.0 (Jun. 2010).
Third Generation Partnership Project, "Technical Specification Group Radio Access Network; Enhanced uplink; Overall description; Stage 2 (Release 9)," 3GPP TS 25.319 V9.1.0 (Sep. 2009).
Third Generation Partnership Project, "Technical Specification Group Radio Access Network; Enhanced uplink; Overall description; Stage 2 (Release 9)," 3GPP TS 25.319 V9.4.0 (Jun. 2010).
Third Generation Partnership Project, "Technical Specification Group Radio Access Network; Enhanced uplink; Overall description; Stage 2 (Release 10)," 3GPP TS 25.319 V10.1.0 (Jun. 2010).
Third Generation Partnership Project, "Technical Specification Group Radio Access Network; Evolved Universal Terrestrial Radio Access (E-UTRA); Multiplexing and channel coding (Release 8)," 3GPP TS 36.212 V8.7.0 (May 2009).
Third Generation Partnership Project, "Technical Specification Group Radio Access Network; Evolved Universal Terrestrial Radio Access (E-UTRA); Multiplexing and channel coding (Release 9)," 3GPP TS 36.212 V9.2.0 (Jun. 2010).

* cited by examiner

METHOD AND APPARATUS FOR TRANSMIT POWER CONTROL FOR MULTIPLE ANTENNA TRANSMISSIONS IN THE UPLINK

CROSS REFERENCE TO RELATED APPLICATIONS

This application is a continuation of U.S. patent application Ser. No. 12/896,668 filed on Oct. 1, 2010, which claims the benefit of U.S. Provisional Application Ser. Nos. 61/248,034 filed on Oct. 2, 2009 and 61/247,995 filed on Oct. 2, 2009, the contents of which are hereby incorporated by reference herein.

BACKGROUND

The demand for wireless communications services has increased significantly, both for voice and data services. To meet the increased demands, new wireless technologies have been developed. For example, in the third generation partnership project (3GPP) wideband code division multiple access (WCDMA), high speed downlink packet access (HSDPA) and high speed uplink packet access (HSUPA) in Release 5 and 6, respectively, have been introduced to achieve a significant increase in spectrum efficiency and peak data rates.

The wireless signal propagated over the air is subject to various signal impairments, including propagation losses, shadowing, multipath fading, Doppler shifts, etc. The multipath fading or fast fading is caused by the combination of the replicas of the transmitted signal with varying phase and amplitude due to reflections on objects encountered in the propagation paths. Multipath fading results in undesirable fluctuations of the received signal power.

A transmit diversity scheme has been developed to cope with the negative effects of fading. A transmit diversity is a scheme of transmitting the same signal over multiple independent paths. The transmit diversity is implemented by sending the same signal at different instants in time (time diversity), over different frequency carriers or subcarriers (frequency diversity), or over different antennas (space diversity). Downlink transmit diversity, both closed loop and open loop, are part of the WCDMA specifications.

Multiple antenna techniques, such as transmit diversity/beamforming or multiple-input multiple-output (MIMO), have not been adopted into the HSUPA. Enhanced uplink performance is important for reducing the WTRU transmission power requirements, especially for high data rate applications. In addition to reduced WTRU battery consumption, an improved UL performance translates into better coverage area for the high data rate services.

A power control is an important factor for interference management in the interference-limited multiuser communication systems, particularly for code division multiple access (CDMA)-based HSUPA system. In such systems, performance of each user depends not only on its own transmission, but also on the transmissions of other users. Conventional power control mechanisms for HSUPA and WCDMA uplink are based on single-input single-output (SISO) system, where only one antenna is used at both the transmitter and receiver ends.

SUMMARY

Embodiments for transmit power control for multiple antenna transmissions in the uplink are disclosed. A wireless transmit/receive unit (WTRU) generates at least one input stream for transmission and applies a gain factor to each channel. The gain factor is determined based on a reference channel power estimate. The WTRU generates at least two data streams from the input stream for transmission via a plurality of antennas and applies weights to the data streams. The gain factor and/or the weights are controlled such that a transmit power on each antenna is within a maximum allowed value. The WTRU may perform power scaling on a condition that a transmit power on any antenna exceeds the maximum allowed value. The WTRU may scale down an enhanced dedicated channel (E-DCH) dedicated physical data channel (E-DPDCH) first before other channels. For multiple E-DCH streams, the WTRU may calculate an E-DPDCH power offset based on an additional power offset factor due to multiple stream transmission.

BRIEF DESCRIPTION OF THE DRAWINGS

A more detailed understanding may be had from the following description, given by way of example in conjunction with the accompanying drawings wherein.

DETAILED DESCRIPTION

Figure 1A:
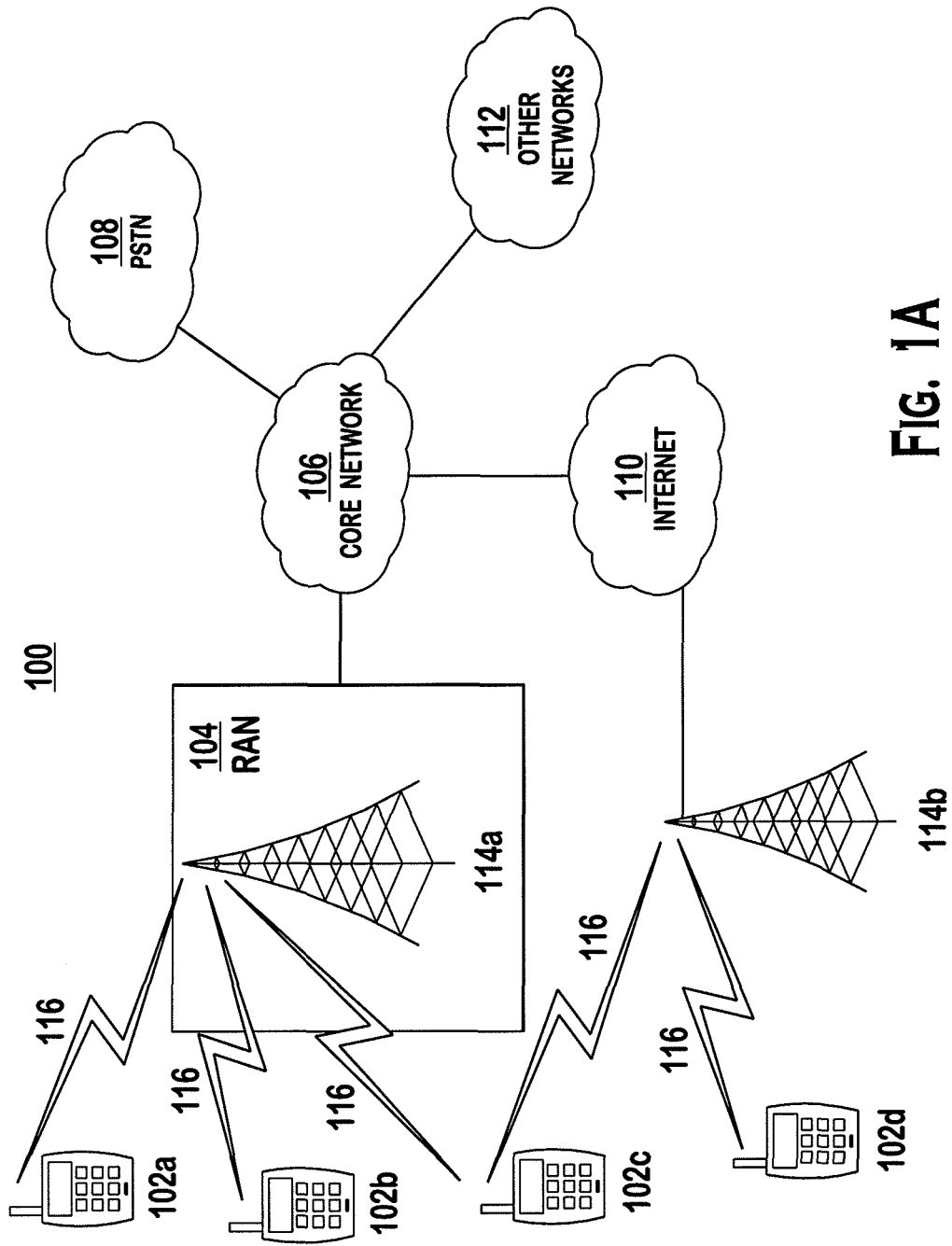
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include WTRUs 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
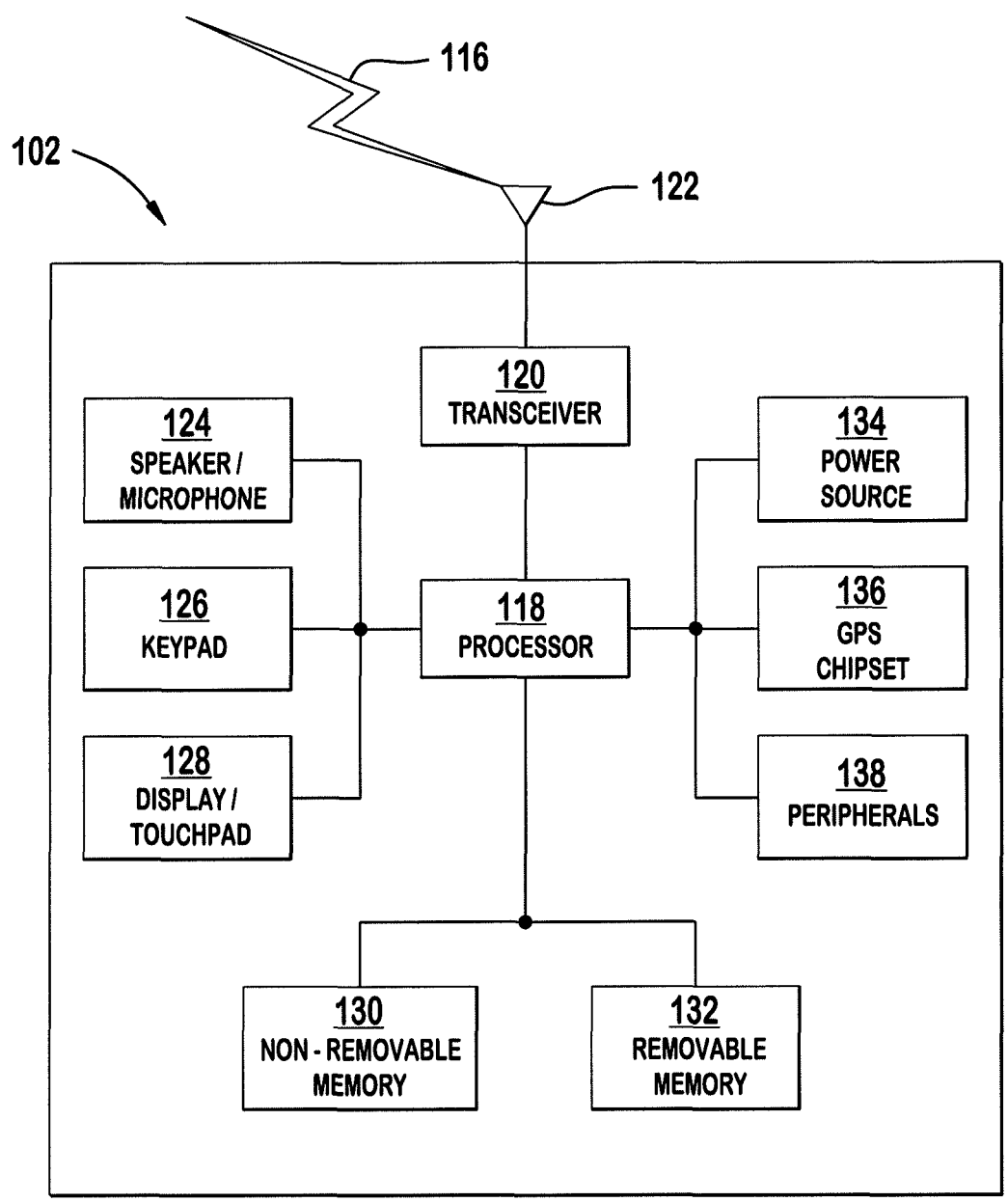
FIG. 1B is a system diagram of an example WTRU that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
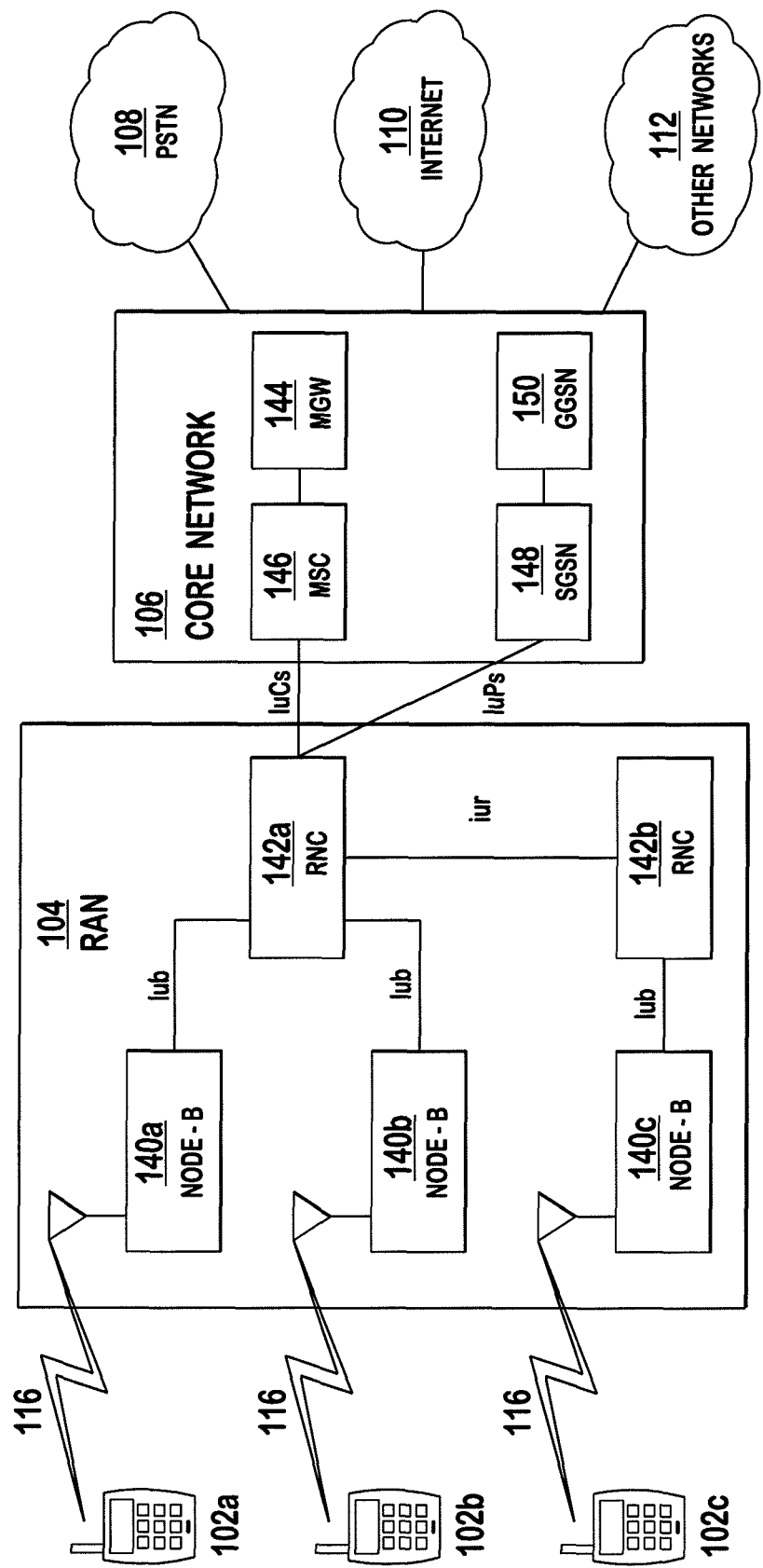
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ a UTRA radio technology to communicate with the WTRUs 102a, 102b, 102c over the air interface 116. The RAN 104 may also be in communication with the core network 106. As shown in FIG. 1C, the RAN 104 may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104. The RAN 104 may also include RNCs 142a, 142b. It will be appreciated that the RAN 104 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 104 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

It should be noted that hereafter the embodiments will be described in the context of 3GPP HSUPA operations for dual-antenna transmissions, but the embodiments are applicable to any wireless technologies and a system with more than two transmit antennas. It should also be noted that in the embodiments disclosed below a dedicated physical control channel (DPCCH) will be used as a power reference channel, but any other channel, (e.g., a pilot channel), may be used as the power reference channel. The terminologies "E-DCH streams" and "E-DCH codewords" will be used interchangeably.

Figure 2:
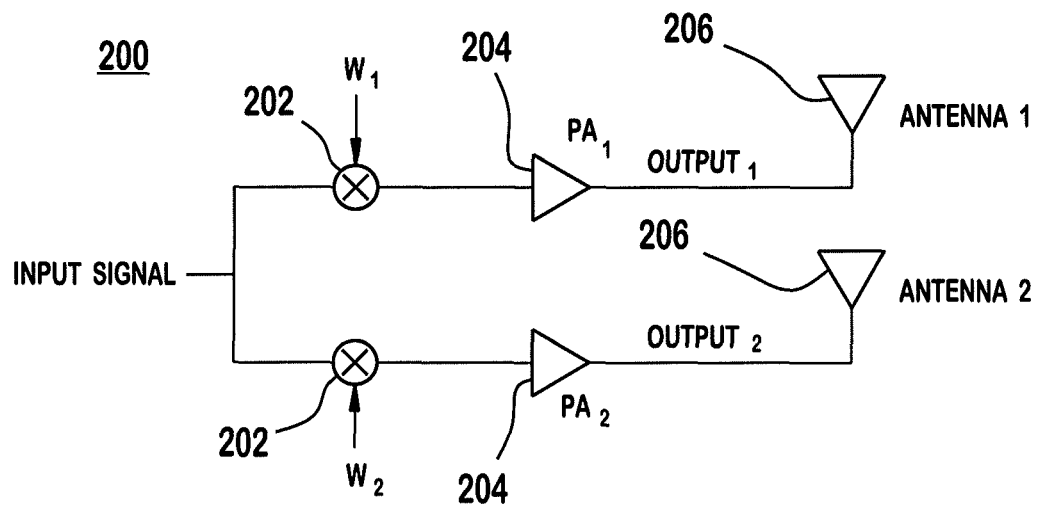
FIG. 2 shows an example transmitter with a beamformer in accordance with one embodiment.

FIG. 2 shows an example transmitter 200 in accordance with one embodiment. The transmitter 200, (which may be located within a WTRU), has a beamforming capability, and includes weighting blocks 202, PAs 204, and antennas 206. The input signal is branched into two branches. The signal from each branch is weighted by a weighting block 202 with a complex weight $w_1$ and $w_2$, respectively, and then amplified by the PA 204. The output signals from the PAs 204, output 1 and output 2, are then sent over the air via antenna 1 and antenna 2, respectively.

Without loss of generality, it is assumed that the input signal power is normalized to 1. The output power measured at the connector of antenna 1 and antenna 2 may be expressed as follows:

$$P_{out1} = |w_1|^2 G_1 \qquad \text{Equation (1)}$$

$$P_{out2} = |w_2|^2 G_2, \qquad \text{Equation (2)}$$

where $G_1$ and $G_2$ are the power gains of amplifiers $PA_1$ and $PA_2$, respectively. If the weights $w_1$ and $w_2$ are unconstrained, the transmitter in FIG. 2 may not generate a constant power output when summed over both antennas.

If the channel gain to the receiver is the same for the two antennas, it is sufficient to use phase offsets to obtain gains from beamforming. However, if the channel gain to the receiver is different for the two antennas, non-unit amplitude weights may be used for each antenna. Practically, the total emitted power from the antenna beamformer may be restrained to unity as it allows re-using some conventional mechanisms, such as power control, without modifications.

Figure 3:
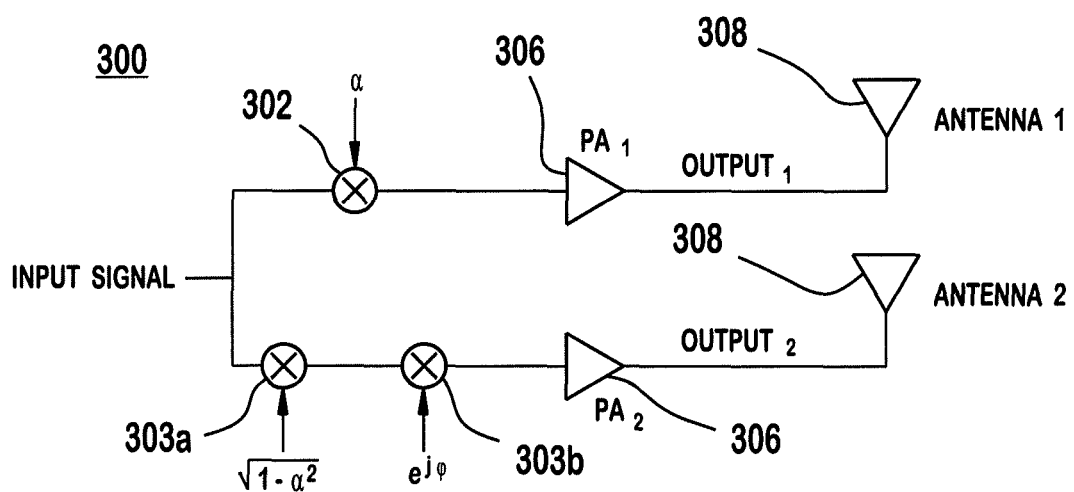
FIG. 3 shows an example transmitter with a beamformer with a unit power constraint.

FIG. 3 shows an example transmitter 300 with a beamformer with a unit power constraint. The transmitter 300, (which may be located within a WTRU), includes weighting blocks 302, PAs 304, and antennas 306. The input signal is branched into two branches. The signal from each branch is weighted with a complex weight, such that an amplitude gain is adjusted by a gain control block 302 in one branch and an amplitude gain and phase are adjusted by a gain control block 303a and a phase control block 303b in the other branch. Both amplitude gain and phase may be adjusted in both branches. The total gain over the two antennas remains the same. The weighted signals are amplified by the PA 304. The output signals from the PAs 304, output 1 and output 2, are then sent over the air via antenna 1 and antenna 2, respectively.

By constraining the PA output to have the same gain, the total power over the two antennas becomes constant for any values of real valued weight amplitude gain $\alpha \leq 1$ and phase offset $\varphi$. Assuming that the input signal power is normalized to 1, the output power at each antenna for the power-constrained beamformer of FIG. 3 may be expressed as follows:

$$P_{out1} = \alpha^2 G_1 \qquad \text{Equation (3)}$$

$$P_{out2} = (1-\alpha^2) G_2. \qquad \text{Equation (4)}$$

The output power at the connector of antenna 1 and antenna 2, $P_{out1}$ and $P_{out2}$, may be limited to a certain value, (say $P_{max,tx}$), due to physical limitations of the devices or due to a network constraint. In 3GPP, the WTRU maximum allowable transmission power, $P_{max,tx}$, is defined as follows:

$$P_{max,tx} = \min\{\text{Maximum\_allowed\_UL\_TX\_Power}, P_{max}\}, \qquad \text{Equation (5)}$$

where Maximum_allowed_UL_TX_Power is set by the UMTS terrestrial radio access network (UTRAN), and $P_{max}$ is the WTRU nominal maximum output power according to the WTRU power class.

The transmitters 200, 300 shown in FIGS. 2 and 3 have a beamforming capability to form a beam with a particular directivity. The spatial shape of the beams may be controlled by the weighting values w1 and w2 for the generic beamformer in FIG. 2 and the weight amplitude gain $\alpha$ and phase offset $\varphi$ for the unit-power constrained beamformer in FIG. 3. Typically, a beam shape and resulting weights are designed based on an optimality criterion. For example, the weights may be designed to obtain maximum power transmitted in a certain angle direction.

In a closed-loop system, the receiver may determine a set of desired transmission weights and signals it to the transmitter. These weights may be quantized so that the signaling load is reduced. Since the quantized weights are, in general, different than the desired unquantized weights, this leads to a difference between the desired beam and the actual beam produced by the transmitter using the quantized weights. The weight quantization is usually designed such that the system performance does not suffer too much from quantization. To a large extent, practical closed-loop beamforming and transmit diversity system are by design robust to variations in beam shape, and a certain level of relaxation on the beamforming weights exactitude can be supported.

A WTRU measures a reference channel power, (e.g., a DPCCH power), at the PA output. A WTRU uses the DPCCH power measurements, for example, for determining the set of supported transport format combinations (TFCs) and enhanced dedicated channel (E-DCH) transport format combinations (E-TFCs), for reporting power headroom measurements, (i.e., UE power headroom (UPH)), and the like.

For TFC and E-TFC restriction, a WTRU calculates numerous parameters in calculation of the amount of the power available for sending data on the uplink. For example, in the E-TFC restriction procedure, a WTRU first determines the power of the DPCCH and the maximum allowed transmit power $P_{max,tx}$. The WTRU also calculates a normalized remaining power margin (NRPM) based on the power of the DPCCH, the dedicated physical data channel (DPDCH), the high speed dedicated physical control channel (HS-DPCCH) and the E-DCH dedicated physical control channel (E-DPCCH) to determine the state (either supported or blocked) of each E-TFC.

In a WTRU with a single PA and a single antenna, the DPCCH power measurement reference point is the PA output, (i.e., at the antenna connector). In a WTRU with two PAs and two antennas, there are two DPCCH power measurements: $P_{DPCCH,1}$ and $P_{DPCCH,2}$, one for each antenna in FIGS. 2 and 3.

In a dual-antenna transmitter with two power amplifiers, the power allocated to each antenna may be relative to a DPCCH or other power reference channel, (e.g., a pilot channel). One DPCCH may be transmitted per antenna in the uplink so that two DPCCHs, (DPCCH1 and DPCCH2), may be transmitted via two antennas.

Embodiments for calculating the DPCCH code power ($P_{DPCCH}$) are disclosed.

In accordance with one embodiment, a WTRU may calculate a slotwise DPCCH power estimate for each slot t by selecting the largest one of the DPCCH power measurements at antenna connector 1 and 2 for each slot t as follows:

$$\hat{P}_{DPCCH}(t)=\max(P_{DPCCH,1}(t),P_{DPCCH,2}(t)), \quad \text{Equation (6)}$$

where $\hat{P}_{DPCCH}(t)$ is a slotwise DPCCH power estimate for slot t, and $P_{DPCCH,1}(t)$ and $P_{DPCCH,2}(t)$ are the slotwise DPCCH power measurements at timeslot t at antenna connector 1 and 2, respectively. The WTRU then calculates the DPCCH code power ($P_{DPCCH}$) by averaging the selected slotwise DPCCH power estimates $\hat{P}_{DPCCH}(t)$ over a transmission time interval (TTI), (e.g., three slots for 2 ms TTI) as follows:

$$P_{DPCCH} = \frac{1}{N}\sum_{t}^{N} \hat{P}_{DPCCH}(t), \quad \text{Equation (7)}$$

where N is the number of slots in a TTI.

This embodiment may ensure that no power limitation is incurred on any of the power amplifiers. In terms of beamforming, the beam pattern is not distorted due to power limitation on one amplifier.

In accordance with another embodiment, the WTRU may calculate the slotwise DPCCH power estimate for each slot by averaging the slotwise DPCCH power measurements for each slot as follows:

$$\hat{P}_{DPCCH}(t) = \frac{P_{DPCCH,1}(t) + P_{DPCCH,2}(t)}{2}. \quad \text{Equation (8)}$$

The WTRU then calculates the DPCCH code power by averaging the slotwise DPCCH power estimates $\hat{P}_{DPCCH}(t)$ over a TTI as in Equation (7).

This embodiment produces a DPCCH power estimate that is averaged over the two PAs and over the 3 slot averaging period. By using this value for NRPM calculations, the WTRU may select transport blocks that may require more power than what is available on any antenna. The filtering may help reduce the variance of the different between the available power and the required power.

In accordance with another embodiment, the WTRU may calculate a filtered DPCCH power estimate for each antenna by filtering the slotwise DPCCH power measurements for each antenna over a TTI.

$$P_{DPCCH,filtered,1} = \frac{1}{N}\sum_{N} \hat{P}_{DPCCH,1}(t), \quad \text{Equation (9)}$$

$$P_{DPCCH,filtered,2} = \frac{1}{N}\sum_{N} \hat{P}_{DPCCH,2}(t), \quad \text{Equation (10)}$$

where $P_{DPCCH,filtered,1}$ and $P_{DPCCH,filtered,2}$ are the filtered DPCCH power estimates for antenna 1 and 2, respectively. The WTRU then calculates the DPCCH code power by selecting the maximum of the filtered DPCCH power estimates as follows:

$$P_{DPCCH}=\max(P_{DPCCH,filtered,1},P_{DPCCH,filtered,2}) \quad \text{Equation (11)}$$

In accordance with another embodiment, the WTRU first calculates a filtered DPCCH power estimate for each antenna by filtering the slotwise DPCCH power measurements for each antenna over a TTI as in equations (9) and (10). The WTRU then calculates the DPCCH code power by averaging the filtered DPCCH power estimates as follows:

$$P_{DPCCH} = \frac{P_{DPCCH,filtered,1} + P_{DPCCH,filtered,2}}{2}. \quad \text{Equation (12)}$$

In accordance with another embodiment, when $P_{max,tx}$ is defined as the WTRU maximum total transmission power from the two transmit antennas, the WTRU first calculates the slotwise DPCCH power estimate for each slot by summing the slotwise DPCCH power measurements at antenna connector 1 and 2 for each slot as follows:

$$\hat{P}_{DPCCH}(t)P_{DPCCH,1}(t)+P_{DPCCH,2}(t) \quad \text{Equation (13)}$$

The WTRU then calculates the DPCCH power estimate by filtering the slotwise DPCCH power estimates over a TTI.

In accordance with another embodiment, when $P_{max,tx}$ is defined as the WTRU maximum total transmission power from the two transmit antennas, the WTRU first calculates a filtered DPCCH power estimate for each antenna by filtering the slotwise DPCCH power estimates over a TTI. The WTRU then calculates the DPCCH code power by summing the filtered DPCCH power estimates for the antennas as follows:

$$P_{DPCCH} = P_{DPCCH,filtered,1} + P_{DPCCH,filtered,2}.$$ Equation (14)

Embodiments for calculating a normalized remaining power margin (NRPM) are disclosed hereafter.

A WRTU calculates the NRPM and uses the value for determining the set of supported E-TFCs. In accordance with one embodiment, the WTRU may first calculate a filtered DPCCH power for each antenna. The WTRU then calculates the NPRM for each antenna separately using the conventional procedure. The WTRU then uses the minimum of the two NRPM to calculate the set of supported E-TFCs. In one alternative, the WTRU may average the two NRPM and uses the result to calculate the set of supported E-TFCs. In another alternative, the WTRU may use the maximum of the two NRPM to calculate the set of supported E-TFCs.

In another embodiment, the WTRU may use the NRPM for each antenna to verify the second criterion for a happy bit. The happy bit indicates whether the WTRU is satisfied with the current grant in uplink transmission. The WTRU may calculate the set of supported E-TFC for each antenna separately and determine if it has sufficient power to transmit a larger identified E-TFC on each antenna according to the conventional procedure. In one embodiment, if the WTRU determines that it has sufficient power to transmit a larger identified E-TFC on both antennas, then the WTRU may continue evaluation of the happy bit according to the second criterion. If the WTRU determines that it does not have sufficient power to transmit a larger identified E-TFC on at least one of the antennas, the WTRU may report that it is "happy" and may stop evaluation of the second criterion.

In another embodiment, if the WTRU determines that it has sufficient power to transmit a larger identified E-TFC on at least one antenna, then the WTRU continues evaluation of the happy bit according to the second criterion. If the WTRU determines that it does not have sufficient power to transmit a larger identified E-TFC on both of the antennas, the WTRU may report that it is "happy" and may stop evaluation of the second criterion.

Embodiments for calculating a UPH are disclosed hereafter.

A WTRU calculates the UPH and reports the UPH to the network. The UPH is the ratio of the maximum WTRU transmission power and the DPCCH code power, and calculated as follows:

$$UPH = P_{max,tx}/P_{DPCCH},$$ Equation (15)

where $P_{DPCCH}$ is the transmitted code power on the DPCCH.

The UPH is transmitted to the Node-B(s) for uplink resource scheduling purposes. The WTRU averages the UPH over a predetermined period, (e.g., 100 ms), and maps it to an index through a mapping table. In the context of UL TX diversity, the UPH calculation may be performed using one of the following embodiments or any combination thereof.

In accordance with one embodiment, the WTRU may calculate the UPH in the conventional way as in equation (15) for each antenna and then reports the more conservative, (i.e., smaller), value to the network. More specifically, if $UPH_1$ is the UPH at the antenna 1 connector and $UPH_2$ is the UPH at the antenna 2 connector, the WTRU may report the minimum of the two values as follows:

$$UPH = \min(UPH_1, UPH_2),$$ Equation (16)

where UPH is the value reported by the WTRU to the network as part of the scheduling information (SI).

In accordance with another embodiment, the WTRU may calculate a UPH for each slot based on the maximum slotwise DPCCH power over the two antennas and average the calculated slotwise UPHs for the averaging period, (e.g.: 100 ms). The UPH may be calculated as follows:

$$UPH = \frac{1}{N}\sum_{t=1}^{N} \frac{P_{max,tx}}{\max(P_{DPCCH,1}(t), P_{DPCCH,2}(t))},$$ Equation (17)

where $P_{DPCCH,1}(t)$ and $P_{DPCCH,1}(t)$ are the slotwise estimates of the DPCCH power at antenna 1 and 2, respectively, and N is the number of samples in the estimate.

In accordance with another embodiment, the WTRU may first calculate the filtered DPCCH code power for each antenna by averaging the DPCCH power measurements at each antenna over the averaging period, (e.g., 10 ms), respectively, and then calculate the UPH using the largest value of the filtered DPCCH code powers over the two antennas, as follows:

$$\hat{P}_{DPCCH,1} = \frac{1}{N}\sum_{t=1}^{N} P_{DPCCH,1}(t),$$ Equation (18)

$$\hat{P}_{DPCCH,2} = \frac{1}{N}\sum_{t=1}^{N} P_{DPCCH,2}(t), \text{ and}$$ Equation (19)

$$UPH = \frac{P_{max,tx}}{\max(\hat{P}_{DPCCH,1}, \hat{P}_{DPCCH,2})}$$ Equation (20)

Alternatively, the WTRU may report a more aggressive UPH value to the network. For example, the WTRU may calculate the UPH in the conventional way for each antenna and then report the more aggressive, (i.e., larger), value to the network. More specifically, if $UPH_1$ is the UPH at the antenna 1 connector and $UPH_2$ is the UPH at the antenna 2 connector, then the WTRU may report the maximum of the two values, as follows:

$$UPH = \max(UPH_1, UPH_2).$$ Equation (21)

In accordance with another embodiment, the WTRU may calculate a UPH for each slot based on the minimum slotwise DPCCH power over the two antennas and average the calculated slotwise UPHs for the averaging period, (e.g.: 100 ms). The UPH may be calculated as follows:

$$UPH = \frac{1}{N}\sum_{t=1}^{N} \frac{P_{max,tx}}{\min(P_{DPCCH,1}(t), P_{DPCCH,2}(t))},$$ Equation (22)

where $P_{DPCCH,1}(t)$ and $P_{DPCCH,2}(t)$ are the slotwise DPCCH power measurement at antenna 1 and 2, respectively, and N is the number of slots in the averaging period.

In accordance with another embodiment, the WTRU may first calculate the filtered DPCCH power for each antenna by averaging the DPCCH power measurements at each antenna over the averaging period, (e.g., 10 ms), respectively, and then calculate the UPH using the minimum value of the filtered DPCCH powers over the two antennas, as follows:

$$\hat{P}_{DPCCH,1} = \frac{1}{N}\sum_{t=1}^{N} P_{DPCCH,1}(t),$$ Equation (23)

$$\hat{P}_{DPCCH,2} = \frac{1}{N}\sum_{t=1}^{N} P_{DPCCH,2}(t), \quad \text{Equation (24)}$$

$$UPH = \frac{P_{max,tx}}{\min(\hat{P}_{DPCCH,1}, \hat{P}_{DPCCH,2})} \quad \text{Equation (25)}$$

Alternatively, the WTRU may report an average UPH value to the network. For example, the WTRU may calculate the UPH in the conventional way for each antenna and then report an average of the two UPH values to the network. If $UPH_1$ is the UPH at the antenna 1 connector and $UPH_2$ is the UPH at the antenna 2 connector, the WTRU may report the average of the two values, as follows:

$$UPH = \frac{UPH_1 + UPH_2}{2}. \quad \text{Equation (26)}$$

In accordance with another embodiment, the WTRU may calculate a UPH for each slot based on the average slotwise DPCCH power over the two antennas and average the calculated slotwise UPHs for the averaging period, (e.g., 100 ms). The UPH may be calculated as follows:

$$UPH = \frac{1}{N}\sum_{t=1}^{N} \frac{P_{max,tx}}{(P_{DPCCH,1}(t)+P_{DPCCH,2}(t))/2}. \quad \text{Equation (27)}$$

In accordance with another embodiment, the WTRU may first calculate an average of the power of the DPCCH at both antennas over the averaging period and then calculate the UPH using the average value of the DPCCH power, as follows:

$$\hat{P}_{DPCCH,1+2} = \frac{1}{2N}\sum_{t=1}^{N}(P_{DPCCH,1}(t)+P_{DPCCH,2}(t)), \quad \text{Equation (28)}$$

$$UPH = \frac{P_{max,tx}}{\hat{P}_{DPCCH,1+2}} \quad \text{Equation (29)}$$

where $\hat{P}_{DPCCH,1+2}$ is the average power of the DPCCH over both antennas.

In accordance with another embodiment, the WTRU may first calculate the total estimated code power of the DPCCH in slot-wise at both antennas and then calculate the slot wise UPH as follows:

$$P_{DPCCH}(t) = P_{DPCCH,1}(t) + P_{DPCCH,2}(t), \quad \text{Equation (30)}$$

$$UPH(t) = \frac{P_{max,tx}}{P_{DPCCH}(t)}, \quad \text{Equation (31)}$$

where $P_{max,tx}$ is the WTRU maximum total transmission power from the two transmit antennas. The WTRU then averages the slot-wise UPHs UPH (t) over the averaging period, (e.g., 100 ms), to calculate the UPH that is to be reported to the network, as follows:

$$UPH = \frac{1}{N}\sum_{t=1}^{N} UPH(t). \quad \text{Equation (32)}$$

In accordance with another embodiment, the WTRU may first calculate slot-wise UPHs at two antennas individually, and calculate the slot-wise UPH by weighting each slot-wise UPH with the corresponding square of the beamforming coefficient α at each antenna as follows:

$$UPH_1(t) = \frac{P_{max,tx,1}}{P_{DPCCH,1}(t)}, \quad \text{Equation (33)}$$

$$UPH_2(t) = \frac{P_{max,tx,2}}{P_{DPCCH,2}(t)}, \quad \text{Equation (34)}$$

$$UPH(t) = \alpha^2(t) \times UPH_1(t) + (1-\alpha^2(t)) \times UPH_2(t), \quad \text{Equation (35)}$$

where $P_{max,tx,1}$ and $P_{max,tx,2}$ are the WTRU maximum transmission powers from transmit antenna 1 and 2, respectively. The WTRU then averages the slot-wise UPHs UPH(t) over the averaging period, (e.g., 100 ms), to obtain the UPH that is to be reported to the network, as follows:

$$UPH = \frac{1}{N}\sum_{t=1}^{N} UPH(t). \quad \text{Equation (36)}$$

The WTRU may use the current beamforming coefficient. Alternatively, the beamforming coefficient that was used the most often in the averaging window may be used. Alternatively, the WTRU may use an average of the beamforming coefficient magnitude during the averaging window.

Alternatively, the WTRU may calculate the UPH in the conventional way for each antenna and report them individually. More particularly, the WTRU calculates $UPH_1$ and $UPH_2$ as follows:

$$UPH_1 = \frac{P_{max,tx,1}}{P_{DPCCH,1}}, \text{ and} \quad \text{Equation (37)}$$

$$UPH_2 = \frac{P_{max,tx,2}}{P_{DPCCH,2}}, \quad \text{Equation (38)}$$

where $P_{DPCCH,1}$ and $P_{DPCCH,2}$ are the DPCCH powers that are averaged slotwise and measured at the connectors of antenna 1 and 2, respectively, and $P_{max,tx,1}$ and $P_{max,t,2}$ are the maximum transmit power of the two antennas. The WTRU may then report the two UPH values to the network individually through the scheduling information.

Two different SIs may be time-multiplexed, (i.e., transmitted at different times). In order to identify the UPHs between the two antennas, the SIs may be restricted to be reported in a specific hybrid automatic repeat request (HARQ) process. For example, the SI associated with $UPH_1$ may be sent on even-numbered HARQ processes and SI associated with $UPH_2$ may be sent on odd-numbered HARQ processes. Alternatively, the SIs associated with $UPH_1$ and $UPH_2$ may be included in PDUs with a different type of transmission sequence numbers (TSNs), (e.g., even or odd-numbered TSN).

Alternatively, the two UPH values may be combined into one SI with a new SI format and transmitted together. The new SI format for transmitting the two UPH values may be defined either by appending a new UPH field to the conventional SI format, or by combining the two UPHs to a new encoded field, etc.

The value of the WTRU maximum allowed power, $P_{max,tx}$, for both E-TFC restriction and UPH measurement for the UL TX diversity may take different values than the single antenna case. The WTRU may use one of the following values of $P_{max,tx}$ for E-TFC restriction and/or UPH measurement, in any order or combination:

(1) The maximum allowed power as configured by the network;

(2) The maximum allowed power as described by the WTRU category;

(3) Half the maximum allowed power as defined by the WTRU category when the WTRU is configured for UL TX Diversity operations; or (4) A fraction ρ (configured by the network or pre-defined in the specifications) of the maximum allowed power as configured by the network or as described by the WTRU category.

The WTRU may receive a configuration message by the network indicating one or more parameters related to the maximum transmit power. The WTRU may then calculate the value of $P_{max,tx}$ based on this set of parameter. The WTRU may calculate the value of $P_{max,tx}$ further based on its WTRU category and/or UL TX diversity status (configured or not).

For example, the network may configure the WTRU with a specific maximum allowed power and a specific fraction of that power for the WTRU to use when configured for UL TX diversity operations, (i.e., $P_{max,tx}$=maximum allowed power when UL TX diversity is not configured, and $P_{max,tx}$=ρ× maximum allowed power when UL TX diversity is configured.

After applying the DPCCH power adjustment and gain factors, when the total transmit power over two antennas or the transmit power on any one of the antennas exceeds the maximum allowed value, (total maximum over the antennas or per-antenna maximum), power scaling may be applied.

In accordance with one embodiment, the power scaling may be applied to the channels before the application of the beamformer coefficients. If the transmit power exceeds the maximum allowed value on any one of the antennas, the E-DPDCH(s) may be first scaled down by reducing its scaling factor to $\beta_{ed,k,reduced}$ until $\beta_{ed,k,reduced}$ reaches a minimum value $\beta_{ed,k,min}$ before any other channels are scaled down. Once $\beta_{ed,k,reduced}$ reaches $\beta_{ed,k,min}$ and if the transmit power still exceeds the maximum allowed value, then power scaling may be further applied equally to all channels. $\beta_{ed,k,reduced}$ is a gain factor of an $E\text{-}DPDCH_k$ after power reduction, and $\beta_{ed,k,min}$ is a configured minimum value for the $E\text{-}DPDCH_k$. In accordance with this embodiment, the beamforming pattern is maintained.

In accordance with another embodiment, if the transmit power exceeds the maximum allowed value on any one of the antennas, E-DPDCHs may be first scaled down until $\beta_{ed,k,reduced}$ reaches $\beta_{ed,k,min}$. If the WTRU transmit power still exceeds the maximum allowed power when $\beta_{ed,k,reduced}$ reaches $\beta_{ed,k,min}$, before any other channels are scaled down, the WTRU may further scale down the power of the E-DPDCHs on the antenna to which a bigger beamforming weight amplitude is applied, until the effective reduced beamforming weight amplitude reaches a minimum value. More specifically, denote the antenna index with the largest and smallest weight amplitude as $$l_{max} = \operatorname*{argmax}_{l=1,2}|w_l| \text{ and } l_{min} = \operatorname*{argmin}_{l=1,2}|w_l|,$$

respectively. The maximum and minimum beamforming weight amplitudes are given by $|w_{max}|$ and $|w_{min}|$ respectively. The WTRU scales with a factor of $\alpha_{ed}$ the E-DPDCHs on the antenna with an index $l_{max}$ until the effective reduced beamforming weight amplitude $|w_{ed,reduced}|$, reaches the minimum beamforming weight amplitude $|w_{min}|$, where $|w_{ed,reduced}|=\alpha_{ed}|w_{max}|$. The WTRU applies the weight amplitude $|w_{ed,reduced}|$ to the E-DPDCHs on that antenna while keeping the phase of the original $w_{max}$, (i.e., $\angle w_{max}$). The WTRU also applies $w_{max}$ to other channels on that antenna. If the WTRU transmit power still exceeds the maximum allowed power when $|w_{ed,reduced}|=|w_{min}|$, equal scaling of all channels may be further applied (also referred to as additional scaling). In accordance with this embodiment, the most important part of the channel information, (i.e., the phase offset between the two weights), may be maintained as much as possible. Therefore, non-significant performance loss of E-DPDCHs would be expected compared to equal scaling of E-DPDCHs on both antennas while the original beamforming pattern on all control channels is maintained.

In accordance with another embodiment, if the transmit power exceeds the maximum allowed value, E-DPDCHs may be first scaled down until $\beta_{ed,k,reduced}=\beta_{ed,k,min}$. If the WTRU transmit power still exceeds the maximum allowed power when $\beta_{ed,k,reduced}=\beta_{ed,k,min}$, before any other channels are scaled down, the WTRU may further scale down the E-DPDCHs on the antenna with index $l_{max}$ until the effective reduced weight amplitude $|w_{ed,reduced}|$ reaches the minimum $|w_{min}|$. The WTRU uses the weight amplitude $|w_{ed,reduced}|$ to the E-DPDCHs and all other channels on that antenna while keeping the phase of the original $w_{max}$ ($\angle w_{max}$). If the WTRU transmit power still exceeds the maximum allowed power when $|w_{ed,reduced}|=|w_{min}|$, the WTRU may further scale down with a factor of $\alpha_c$ other channels on the antenna with index $l_{max}$ until the effective reduced weight amplitude $|w_{c,reduced}|$ reaches a minimum $|w_{min}|$, where $|w_{c,reduced}|=\alpha_c|w_{max}|$. The WTRU uses the weight amplitude $|w_{c,reduced}|$ to the other channels, (i.e., non-E-DPDCHs channels), on that antenna while keeping the phase of the original $w_{max}$ ($\angle w_{max}$). If the WTRU transmit power still exceeds the maximum allowed power when $|w_{c,reduced}|=|w_{min}|$, equal scaling of all channels may be applied.

In accordance with another embodiment, the power scaling may be applied to the signals on each antenna after the application of the beamformer coefficients. The signals on each antenna may be scaled down independently by adjusting the beamformer coefficient magnitude on that antenna when the transmit power on that antenna exceeds the maximum allowed value. If the transmit powers on both antennas exceed the corresponding maximum allowed values, the power scaling may be performed on both antennas in parallel. This may result in beamforming pattern distortion. However, the system performance may not be impacted too much by the beam distortion and this may be advantageous for WTRUs at cell edge.

In accordance with another embodiment, the power scaling may be applied to the signals on each antenna after the application of the beamformer coefficients such that for each antenna, the E-DPDCHs are first scaled down before any other channels on that antenna are scaled down until $\beta_{ed,k,reduced}$ reaches $\beta_{ed,k,min}$. If the transmit power still exceeds the maximum allowed value when $\beta_{ed,k,reduced}$ reaches $\beta_{ed,k,reduced\ min}$, then equal scaling of all channels on that antenna may be applied. This embodiment would result in different beam patterns for the control and data channels. This may be desirable, for example, to ensure better protection of the control channels at the expense of data channels. This approach may be advantageous from an implementation perspective as it may re-use the conventional power scaling scheme on each antenna separately.

In accordance with another embodiment, a 2-step procedure may be implemented. In a first step, the weight gain (i.e., combination of beamforming coefficient and PA gain), on each antenna may be adjusted independently to avoid exceeding the maximum power on each antenna. Power reduction may be limited to a certain value. When the weight gain on one antenna cannot be reduced further and the transmission power still exceeds the maximum allowed power, the conventional power scaling scheme may be applied in a second step on a condition that a threshold test passes. This embodiment may allow some level of beam distortion before applying the more aggressive power scaling rules.

For the purpose of description, and without loss of generality, the following definitions are used:

$\alpha_1$: The weight gain for antenna 1;
$\alpha_2$: The weight gain for antenna 2;
$\varphi_1$: The phase for antenna 1;
$\varphi_2$: The phase for antenna 2; and
$T_{th}$: A threshold value.

In a first step, if a transmit power on any antenna exceeds a maximum allowed power, a WTRU reduces the weight gain, (i.e., combination of beamforming gain and PA gain), on that antenna. Each antenna may be subject to a configured minimum weight gain. More specifically for antenna j, the WTRU calculates a reduced weight gain value ($\alpha'_j$) such that the maximum power is not exceeded on that antenna. The WTRU then performs a threshold test. If the threshold test is met for one or both antennas, the second step is applied. If the threshold test is not met for any antenna, the second step is not applied.

As an example of the threshold test, the WTRU may calculate the relative changes of the amplitude gain and compare it to a threshold. The WTRU may calculate the relative change for antenna j as follows:

$$\text{Relative change} \equiv C_{rel,j} = \frac{|\alpha'_j - \alpha_j|}{\alpha_j}. \qquad \text{Equation (39)}$$

If the change is higher than the threshold, (i.e., $C_{rel,j} > T_{th}$), the second step is applied.

Alternatively, the WTRU may calculate the absolute change of the amplitude gain for antenna j and compare it to a threshold. The WTRU may calculate the amplitude gain change as follows:

$$\text{Absolute change} \equiv C_{abs,j} = |\alpha'_j - \alpha_j|. \qquad \text{Equation (40)}$$

If the change is higher than the threshold, (i.e., $C_{abs,j} > T_{th}$), the second step is applied.

Alternatively, the WTRU may calculate the resulting weight vector and ensure that it is closer to the original weight vector than any other weight vector in the codebook. The original weight vectors and weight vectors after power reduction are defined as w and w', respectively, as follows:

$$w = \begin{bmatrix} \alpha_1 e^{j\varphi_1} \\ \alpha_2 e^{j\varphi_2} \end{bmatrix}, \text{ and} \qquad \text{Equation (41)}$$

$$w' = \begin{bmatrix} \alpha'_1 e^{j\varphi_1} \\ \alpha'_2 e^{j\varphi_2} \end{bmatrix}. \qquad \text{Equation (42)}$$

The WTRU verifies that the distance between the resulting weight vector and the original weight vector is smaller than any other weight vectors in the codebook. In other words, the following condition should be met:

$$w_{closest} = w, \qquad \text{Equation (43)}$$

where $$w_{closest} = \arg\min_{w_k \in codebook} \|w_k - w'\|.$$

If the threshold test is met, a second step is performed. In the second step, a power scaling may be applied equally at both antennas to ensure that the maximum power is not exceeded on any antenna. In applying the power scaling equally at both antennas, the WTRU may reduce the power of the data channels, (e.g., E-DPDCH), first until either the transmission power no longer exceeds the maximum allowed power on both antennas or until a minimum power for the data channel is reached, (i.e., $\beta_{ed,k,reduced} = \beta_{ed,k,min}$). If the transmit power still exceeds the maximum allowed power on one or both of the antenna when the minimum power for the data channel is reached, an additional scaling may be applied.

The WTRU may apply the additional scaling using the unscaled antenna weights, (i.e., $\alpha_j$, j=1,2). Alternatively, the WTRU may apply the additional scaling using the scaled antenna weights, (i.e., $\alpha'_j$, j=1,2). When using the unscaled antenna weights, the beam pattern is maintained. When using the scaled antenna weights, it introduces beam pattern distortion, wherein the amount of distortion is dependent on the choice of threshold criterion and threshold value.

Figure 4:
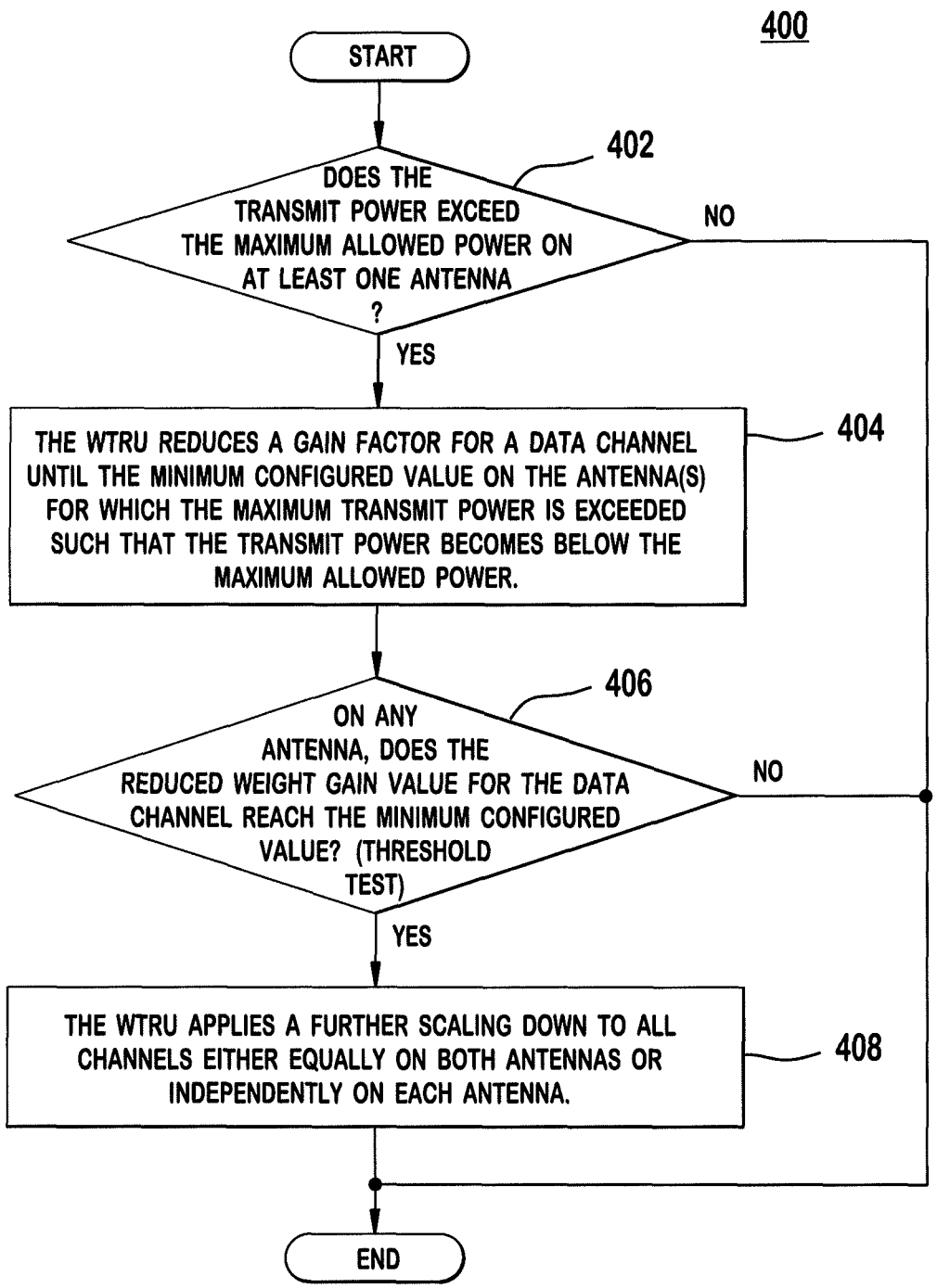
FIG. 4 is a flow diagram of an example process of transmit power control in accordance with the 2-step approach.

FIG. 4 is a flow diagram of an example process 400 of transmit power control in accordance with an alternative embodiment. A WTRU determines whether a transmit power for any one of the antennas exceeds the maximum allowed power (402). If a transmit power for any antenna does not exceed the maximum allowed power, no power scaling may be performed. If a transmit power for any one of the antennas exceeds the maximum allowed power, the WTRU reduces a gain factor for a data channel, (e.g., E-DPDCHs), until the minimum configured value on the antenna(s) for which the maximum transmit power is exceeded such that the transmit power becomes below the maximum allowed power (404). This power scaling may be performed equally on both antennas in which case the beam pattern is maintained. Alternatively, this power scaling may be performed independently on each antenna, in which case some beam distortion may result.

The WTRU then performs a threshold test to verify if, on any antenna, the reduced weight gain value for the E-DPDCH reaches the minimum configured value (406). If the reduced weight gain value for the E-DPDCH does not reach the minimum configured value on any antenna, no further power scaling is performed. If the reduced weight gain value for the E-DPDCH reaches the minimum configured value on one or both antennas, (i.e., when $\beta_{ed,k,reduced}=\beta_{ed,k,min}$ on one or both antennas), which means the transmit power still exceeds the maximum allowed power for any one of the antennas, a further scaling down may be applied to all channels either equally on both antennas or independently on each antenna (408).

Since the power scaling on the data channel in step 404 before the threshold test may be carried out independently for each antenna, the data channel on one of the antennas may reach the minimum power before the data channel on the other antenna. In this case, the additional scaling in step 408 after the threshold test may be applied on the resulting signal of both antennas as is (that is with potentially unequal scaling of the data channels). Alternatively, the WTRU may first apply additional scaling to force the maximum reduction on the data channels of both antennas and then apply further power scaling on the result at step 408.

Embodiments for transmit power control for multiple E-DCH codewords spatial multiplexing are disclosed hereafter. For the dual E-DCH codeword spatial multiplexing, one power control loop may be established for each E-DCH codeword. In this case, a WTRU transmits two pilot channels (DPCCH1 and DPCCH2), and receive a separate transmit power control (TPC) command for each E-DCH codeword, and conventional power control may be applied to each DPCCH independently. This provides one relative power reference for each stream.

Figure 5:
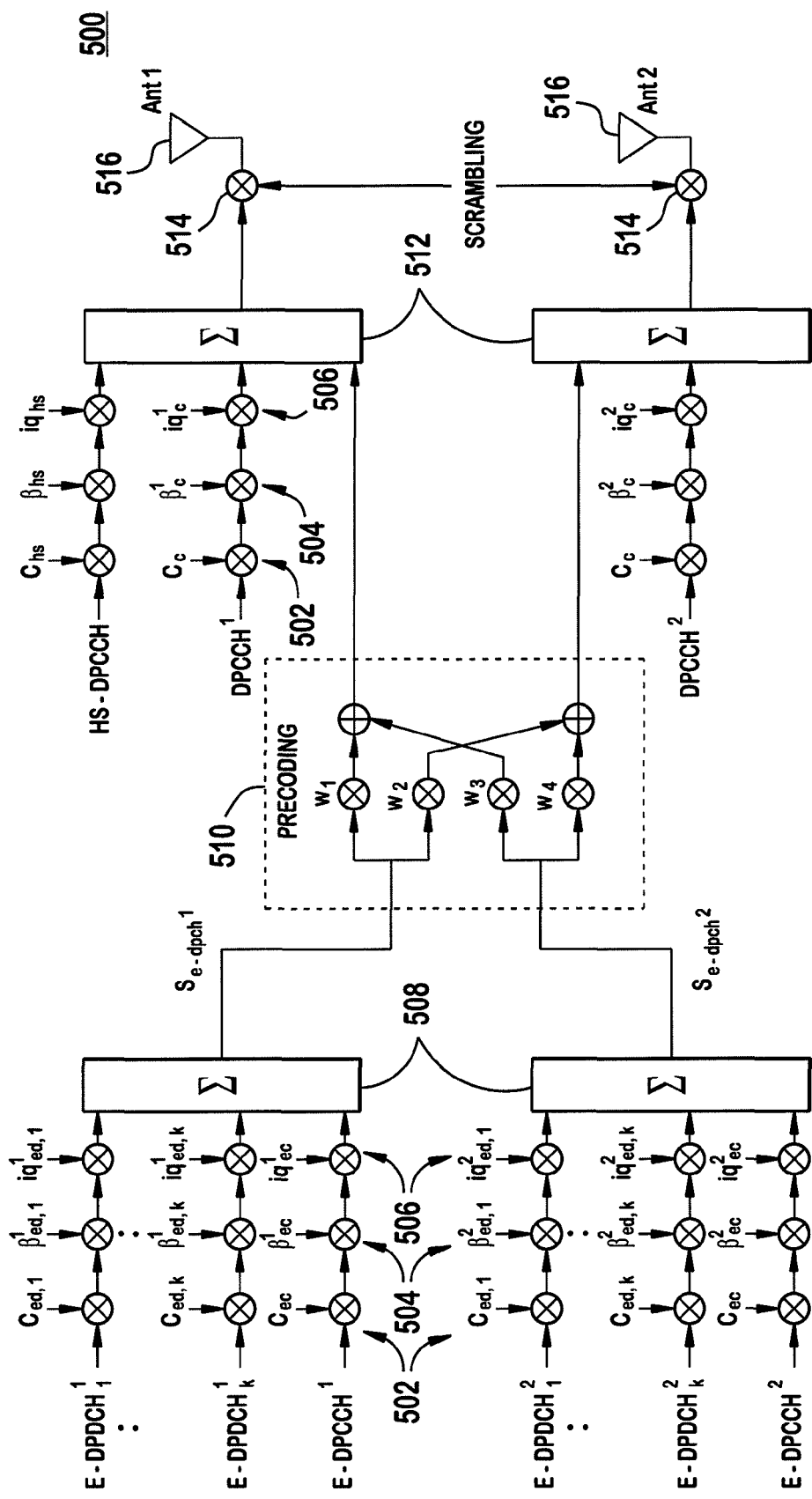
FIG. 5 shows an example transmitter for dual E-DCH codeword spatial multiplexing in accordance with one embodiment.

FIG. 5 shows an example transmitter 500 for dual E-DCH codeword spatial multiplexing in accordance with one embodiment. In this example, it is assumed that no DPDCH is transmitted when the WTRU is configured in UL MIMO mode, two E-DPDCHs in different E-DPDCH streams share the same channelization code, two E-DPCCHs share the same channelization code, two DPCCHs share the same channelization code, and the pilots in the two DPCCHs are orthogonal to each other. It should be noted that this assumption is just for illustration purpose, and any configuration may be applied, (e.g., DPDCH may be simultaneously transmitted, and different channelization codes may be utilized for any of the channels). FIG. 5 shows that the DPCCHs are not pre-coded, but as an alternative, the DPCCHs or any other control channels may also be pre-coded. w ($w_1$ $w_2$ $w_3$ $w_4$) denotes the precoding coefficient. The superscript is the index of the E-DCH codeword or the physical antenna.

The transmitter 500, (i.e., WTRU), comprises channelization blocks 502, gain control blocks 504, I/Q mapping blocks 506, channel combiners 508, a precoding block, scrambling blocks, and antennas. Two E-DCH codewords, (i.e., two E-DCH transport blocks), may be transmitted simultaneously. Each E-DCH codeword may be mapped to one or more than one E-DPDCH, and an E-DPCCH is transmitted along with each E-DCH codeword. Each channel, (i.e., E-DPDCH, E-DPCCH, DPCCH, HS-DPCCH), is spread with a corresponding channelization code by a channelization block 502, and multiplied with a corresponding gain factor by a gain control block 504, and mapped to either an I channel or a Q channel by the I/Q mapping block 506. The E-DPDCHs and the E-DPCCH for each E-DCH codeword are combined by the channel combiner 508, respectively, and multiplied with precoding weights by the precoding block 510 to be distributed to each antenna. The DPCCH, the HS-DPCCH, and the precoded E-DCH channels are combined by the channel combiner 512 for each antenna. The channel combined signals are multiplied with a scrambling code by the scrambling block 514, and then transmitted via the antennas 516.

A WTRU may calculate the E-DPDCH/DPCCH power offset, (i.e., E-DPDCH power offset to the power reference channel), for each stream independently. In calculating the E-DPDCH/DPCCH power offset, the WTRU calculates a temporary variable $\beta_{ed,i,harq}$. For each stream, when the E-DPDCH power extrapolation formula is configured, $\beta_{ed,i,harq}$ may be calculated as follows:

$$\beta_{ed,i,harq} = \beta_{ed,ref} \sqrt{\frac{L_{e,rf}}{L_{e,i}}} \sqrt{\frac{K_{e,i}}{K_{e,ref}}} \cdot 10^{\left(\frac{\Delta harq}{20}\right)} \cdot 10^{\left(\frac{\Delta mimo}{20}\right)}. \quad \text{Equation (44)}$$

When the E-DPDCH power interpolation formula is configured, $\beta_{ed,i,harq}$ may be calculated as follows:

$$\beta_{ed,i,harq} = \sqrt{\frac{L_{e,ref,1}}{L_{e,i}}} \cdot \sqrt{\left(\left(\frac{\frac{L_{e,ref,2}}{L_{e,ref,1}}\beta^2_{ed,ref,2} - \beta^2_{ed,ref,1}}{K_{e,ref,2} - K_{e,ref,1}}\right)(K_{e,i} - K_{e,ref,1}) + \beta^2_{ed,ref,1}\right)} \cdot 10^{\left(\frac{\Delta harq}{20}\right)} \cdot 10^{\left(\frac{\Delta mimo}{20}\right)} \quad \text{Equation (45)}$$

with the exception that $\Delta_{ed,i,harq}$ is set to 0 if $$\left(\frac{\frac{L_{e,ref,2}}{L_{e,ref,1}}\beta^2_{ed,ref,2} - \beta^2_{ed,ref,1}}{K_{e,ref,2}}\right)(K_{e,i} - K_{e,ref,1}) + \beta^2_{ed,ref,1} \leq 0.$$

The equations (44) and (45) may also be employed in the E-TFC restriction procedure to determine the set of supported E-TFCs.

In equations (44) and (45), $\Delta$mimo is an additional power offset factor introduced to take into account the additional required received power due to the MIMO or dual-stream transmission. $\Delta$mimo compensates for the additional intra-WTRU interference caused by the additional MIMO stream at the Node-B receiver. Different Node-B receiver structure may require different level of compensation and thus $\Delta$mimo may be signaled to the WTRU by a higher layer. $\Delta$mimo may take a different value for each stream.

The value of $\Delta$mimo may depend on the MIMO operation mode: spatial-multiplexing or transmit diversity/beamforming. For example, the WTRU may be configured with 2 values of $\Delta$mimo, and one value may be used when two streams are transmitted and the other value may be used when a single stream is transmitted. The WTRU may determine, (e.g., based on Node-B signaling, channel state information, available headroom, etc.), how many streams can be transmitted before the E-TFC restriction, and calculate the set of supported E-TFCs and the power required for the chosen transport block (TB) size using the appropriate value of $\Delta$mimo.

The parameter $\Delta$mimo may be combined in one of the variables in equations (44) and (45). For example, the additional MIMO power offset may be absorbed in the HARQ power offset (Δharq). In this case, the WTRU may be configured with two sets of HARQ power offsets: one set for dual-stream transmissions and another set for single-stream transmission. Alternatively, the additional MIMO power offset may be absorbed in the reference gain factors ($\beta_{ed,ref}$). In that case, the WTRU may be configured with two sets of reference gain factors: one set for dual-stream transmissions and another set for single-stream transmission.

The value of Δmimo may depend on static parameters and/or dynamic parameters. The static parameters are in general related to the transmitter and receiver structures, including the receiver type at the Node-B, whether or not the DPCCH is precoded, whether or not the E-DPCCH is precoded, or the like. These static parameters may be taken into consideration in the value Δmimo, which may be signaled by the network. Dynamic parameters may include the MIMO operating mode, (e.g., spatial-multiplexing vs. transmit diversity/beamforming), and the quality of service (QoS) of each stream, which may change on a TTI basis. For the case of HSUPA, the HARQ profile may be considered as a parameter for QoS.

The Δmimo for one stream may depend on the TB size (or equivalently power) on that E-DCH stream or alternatively the TB size (or equivalently power) of the other E-DCH stream. In a dual-power control loop case, it may happen that a smaller transport block requires more transmission power. In such case, an additional MIMO power offset may be specified for all transport block sizes. To reduce the signaling overhead in this case a reduced set of additional MIMO power offsets may be used. This reduced set of additional MIMO power offsets may be designed to specify the additional MIMO power offset for a range of TB size. For example, a WTRU may receive a list of transport block size, (or indices, i.e., E-TFCI), and associated additional MIMO power offset from the network and construct a table with the range and associated additional MIMO power offset, as shown in Table 1.

TABLE 1

| Range of E-TFCI | Associated Δmimo (in dB) |
| --- | --- |
| <25 | 0 |
| 25, . . . , 50 | 0.25 |
| 51, . . . , 75 | 0.5 |
| 76, . . . , 100 | 0.75 |
| 100, . . . , 128 | 1.0 |

The Δmimo value may depend on the pair of TB sizes transmitted (one TB size per stream). The ratio of inter-stream interference depends to some extent on the relative power between each stream. Thus, a large transport block may interfere a small transport block relatively more than it would on a large transport block.

The additional MIMO power offset value may depend on the power offset difference between the two E-DCH streams. Assuming, without loss of generality, that the first E-DCH stream is transmitted at a higher power than a second E-DCH stream. Let $\Delta P_{E\text{-}DCH}$ be the power difference (in dB) between the power of the first E-DCH and the power of the second E-DCH. The power of the first E-DCH is defined as the total power of all E-DPDCHs associated with the first E-DCH stream and may also include the power of the associated E-DPCCH. The power of the second E-DCH is defined as the total power of all E-DPDCHs associated with the second E-DCH stream and may also include the power of the associated E-DPCCH. The WTRU may calculate values of additional MIMO power offsets Δmimo1 and Δmimo2 to apply to the first and second E-DCH streams, respectively based on the calculated value of $\Delta P_{E\text{-}DCH}$.

The values of $\Delta \text{mimo}_j$ j=1,2, may be defined based on various ranges of $\Delta P_{E\text{-}DCH}$, as illustrated in Table 2. The WTRU uses the values to determine the required additional MIMO power offset for each E-TFC pair. In E-TFC restriction, the WTRU may also calculate the required power for every E-TFC pair based on Table 2.

TABLE 2

| $\Delta P_{E\text{-}DCH}$ range (dB) | $\Delta \text{mimo}_1$ | $\Delta \text{mimo}_2$ |
| --- | --- | --- |
| −∞ | 1 | N/A |
| 0 | 0.5 | 1 |
| 1-3 | 0 | 2 |
| 3-6 | 0 | 3 |
| 6-more | 0 | 5 |

When the total WTRU transmit power after applying DPCCH power adjustment exceeds the maximum allowed value, power scaling may be applied to two E-DCH streams in parallel. E-DPDCH(s) may be scaled down first until $\beta_{ed,k,reduced} = \beta_{ed,k,min}$ on both streams before any other channels are scaled. The E-DPDCH stream with a highest DPCCH power may be scaled down first until $\beta_{ed,k,reduced} = \beta_{ed,k,min}$ on that stream. Then, if needed, the E-DPDCH on the other stream may be scaled down until $\beta_{ed,k,reduced} = \beta_{ed,k,min}$ on that stream. When $\beta_{ed,k,reduced} = \beta_{ed,k,min}$ on both streams, equal scaling of all channels on both streams may be applied. $\beta_{ed,k,min}$ may be configurable per stream.

Alternatively, the WTRU may reduce the power of the E-DPDCH on a predetermined stream first. In one example, the predetermined stream may be the secondary stream. If the WTRU is still power-limited after the power scaling on the predetermined stream, then the WTRU may further reduce the power of the E-DPDCH on the other stream. If the WTRU is still power-limited after power scaling on the other stream, the additional scaling may be applied equally on both streams. The primary stream may be defined as the data stream that is transmitted over the preferred precoding weights signaled by the network and the secondary data stream may be defined as the other data stream transmitted over the precoding weights orthogonal to that used by the primary stream.

In accordance with another embodiment, the gain factor of the E-DPDCH of both streams may be reduced equally until the transmitted power no longer exceeds the maximum allowed value or until the reduced gain factor of the E-DP-DCH on one stream reaches its minimum value, (i.e., $\beta_{ed,k,reduced} = \beta_{ed,k,min}$). If the transmitted power still exceeds the maximum allowed value, then the gain factor of the E-DPDCH on the other stream may be reduced until the transmit power no longer exceeds maximum value or until the gain factor of the E-DPDCH for that stream reaches its minimum value. If the transmit power still exceeds the maximum allowed value, equal scaling may be applied to all channels until the transmit power no longer exceeds the maximum allowed value.

Embodiments for sending UL transmit power control (TPC) commands for both E-DCH streams on a single DL DPCCH or fractional dedicated physical channel (F-DPCH) are disclosed. The network sends a TPC command for each E-DCH stream so that the WTRU receives two TPC commands for the two E-DCH streams on the downlink.

Figure 6:
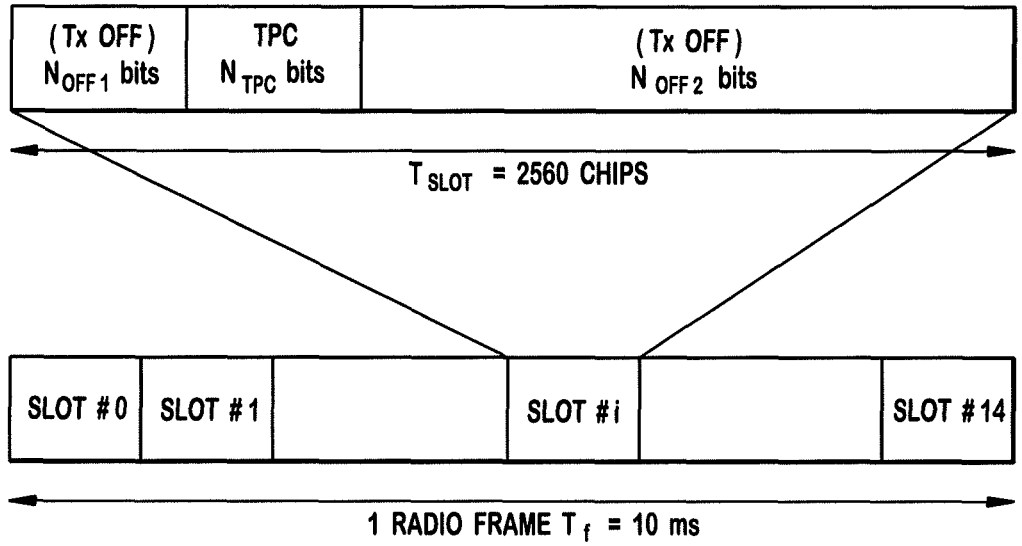
FIG. 6 shows a conventional F-DPCH structure.

In accordance with one embodiment, the TPC commands for two E-DCH streams of a WTRU may be time-multiplexed on an F-DPCH. FIG. 6 shows a conventional F-DPCH structure. In a conventional F-DPCH, two TPC bits per TPC command may be transmitted in each slot of the F-DPCH, so that up to 10 WTRUs are supported by a single F-DPCH.

Figure 7:
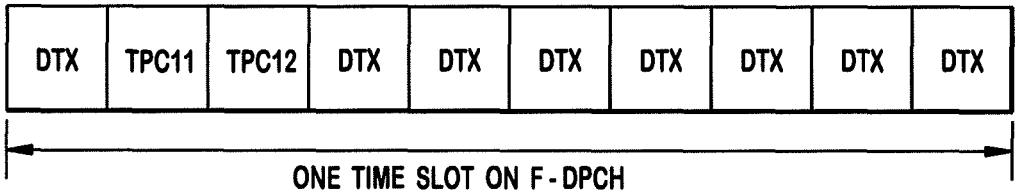
FIG. 7 shows an example TPC command transmission on an F-DPCH in accordance with this embodiment.

FIG. 7 shows an example TPC command transmission on an F-DPCH in accordance with this embodiment. In FIG. 7, TPC11 and TPC12 are the TPC command bits for stream 1 and stream 2, respectively, for the WTRU. Two TPC bits may be transmitted for each TPC command, (i.e., $N_{TPC}=2$). In this case, up to five WTRUs configured for dual stream transmissions may be supported by one F-DPCH. One TPC bits field is transmitted to a WTRU that is not configured for dual stream transmissions. The TPC commands for the two E-DCH streams may or may not be adjacent in time on the F-DPCH.

In accordance with another embodiment, a new TPC bit pattern may be defined to combine the transmit power control commands for two power control loops, such that $N_{TPC}$ bits per TPC command indicate the TPC commands for two data streams. The gain of the F-DPCH field for the TPC command may be increased to support the additional information required.

Table 3 shows conventional F-DPCH slot format 0, and example slot formats for the F-DPCH that may support more than 2 TPC bits per slot. For example, slot format 0A and 0C support 4 TPC bits per slot and slot format 0B and 0D support 8 TPC bits per slot. Slot format 0 is the conventional F-DPCH slot format. Different F-DPCH slot formats may also be derived.

TABLE 3

| Slot Format #i | Channel Bit Rate (kbps) | Channel Symbol Rate (ksps) | SF | Bits/ Slot | $N_{OFF1}$ Bits/ Slot | $N_{TPC}$ Bits/ Slot | $N_{OFF2}$ Bits/ Slot |
|---|---|---|---|---|---|---|---|
| 0* | 3 | 1.5 | 256 | 20 | 2 | 2 | 16 |
| 0A | 3 | 1.5 | 256 | 20 | 0 | 4 | 16 |
| 0B | 3 | 1.5 | 256 | 20 | 0 | 8 | 12 |
| 0C | 3 | 1.5 | 256 | 20 | 2 | 4 | 12 |
| 0D | 3 | 1.5 | 256 | 20 | 2 | 8 | 10 |

Stream 1 and Stream 2 columns in Table 4 correspond to the TPC command interpretation for the first and second stream (or equivalently the first and second DPCCH), respectively. For a WTRU configured for the MIMO mode with dual codeword transmission, the TPC command for the WTRU is interpreted according to Table 4.

TABLE 4

| TPC Bit Pattern | | | TPC command | |
|---|---|---|---|---|
| N_TPC = 2 | N_TPC = 4 | N_TPC = 8 | Stream 1 | Stream 2 |
| 11 | 1111 | 11111111 | 1 | 1 |
| 00 | 0000 | 00000000 | 0 | 0 |
| 01 | 0101 | 01010101 | 0 | 1 |
| 10 | 1010 | 10101010 | 1 | 0 |

The new TPC bit pattern for dual streams may be defined to maintain the backward compatibility. As an example, Table 5 shows the TPC bit pattern for the $N_{TPC}=4$ slot format 0C and $N_{TPC}=8$ slot format 0D for backward compatible. Similar table may be derived for different slot formats. The TPC information for the first stream is the same as for the signal stream case.

TABLE 5

| TPC Bit Pattern | | | TPC command | |
|---|---|---|---|---|
| N_TPC = 2 | N_TPC = 4 | N_TPC = 8 | Stream 1 | Stream 2 |
| 11 | 1111 | 11111111 | 1 | 1 |
| 00 | 0000 | 00000000 | 0 | 0 |
| N/A | 0011 | 00001111 | 0 | 1 |
| N/A | 1100 | 11110000 | 1 | 0 |

In accordance with another embodiment, a new F-DPCH format with a smaller spreading factor may be introduced to send more information bits.

A problem may occur regarding how to generate or combine a TPC command when a WTRU switches between a single power control loop and a dual power control loop. For example, the WTRU may choose to transmit with one stream/codeword although the network signals the WTRU the current UL channel condition supports dual stream transmission. Consequently, one UL power control loop is sufficient for a single stream transmission while during the transition from the two power control loop to the single power control loop the WTRU may receive two TPC commands and combine the two TPC commands to derive a single TPC command to apply to the single stream transmission. This may be relevant, for instance, when the number of transmitted streams is dynamic but vary relatively slowly.

The WTRU may combine the two TPC commands for the two streams as follows. The WTRU may generate the derived TPC command (TPC_cmd) of '1' if the hard decision on the value of both TPC commands are '1', otherwise, generate the derived TPC command (TPC_cmd) of '−1'.

Alternatively, the network may transmit the TPC command for the single stream over the two configured TPC fields. The conventional F-DPCH format does not need to be reconfigured. The WTRU receives both TPC fields and make a decision on the final TPC command based on the information it receives from both TPC fields. The derived TPC command may be generated by weighting the soft decision on each of the TPC fields. For example, denoting the soft decision on i-th stream TPC as $P_i$, i=1,2, the TPC command may be derived as follows:

$$\text{TPC\_cmd} = \begin{cases} 1, & \text{if } P_1 + P_2 > 0 \\ -1, & \text{if } P_1 + P_2 \leq 0 \end{cases}.$$

It is also possible to have a single power control loop for WTRUs that operate in a dual codeword spatial multiplexing UL MIMO mode. In this case, there is one UL power control loop per WTRU, independent of the WTRU's configuration on the MIMO operation mode. The DPCCH gain factors for both DPCCHs may be set to the same value, (i.e., $\beta_c^1 = \beta_c^2$). In other words, the power of the second DPCCH takes the same value as the first DPCCH power.

Alternatively, the DPCCH gain factors may be set differently as follows: $\beta_c^2 = \alpha \beta_c^1$, where α is a fixed value that may be signaled by the network. In such case, the DPCCH power for the second DPCCH may be adjusted at each slot based on the power of the first DPCCH and the configured gain offset a.

Alternatively, the power offset for the second pilot channel, (e.g., DPCCH), may depend on the ratio of total pilot symbols contained in the first and second pilot channel. For instance, if the first pilot channel carries 8 pilot symbols and the second pilot channel carries 10 pilot symbols, then the power offset of the second pilot channel with respect to the first pilot channel may be set to $8/10$ or approximately 1 dB lower, (i.e., $10 \log_{10}(8/10) = -0.97$ dB). This value may be calculated by the WTRU upon configuration of the pilot channels, or may be pre-calculated based on possible ratios.

Figure 8:
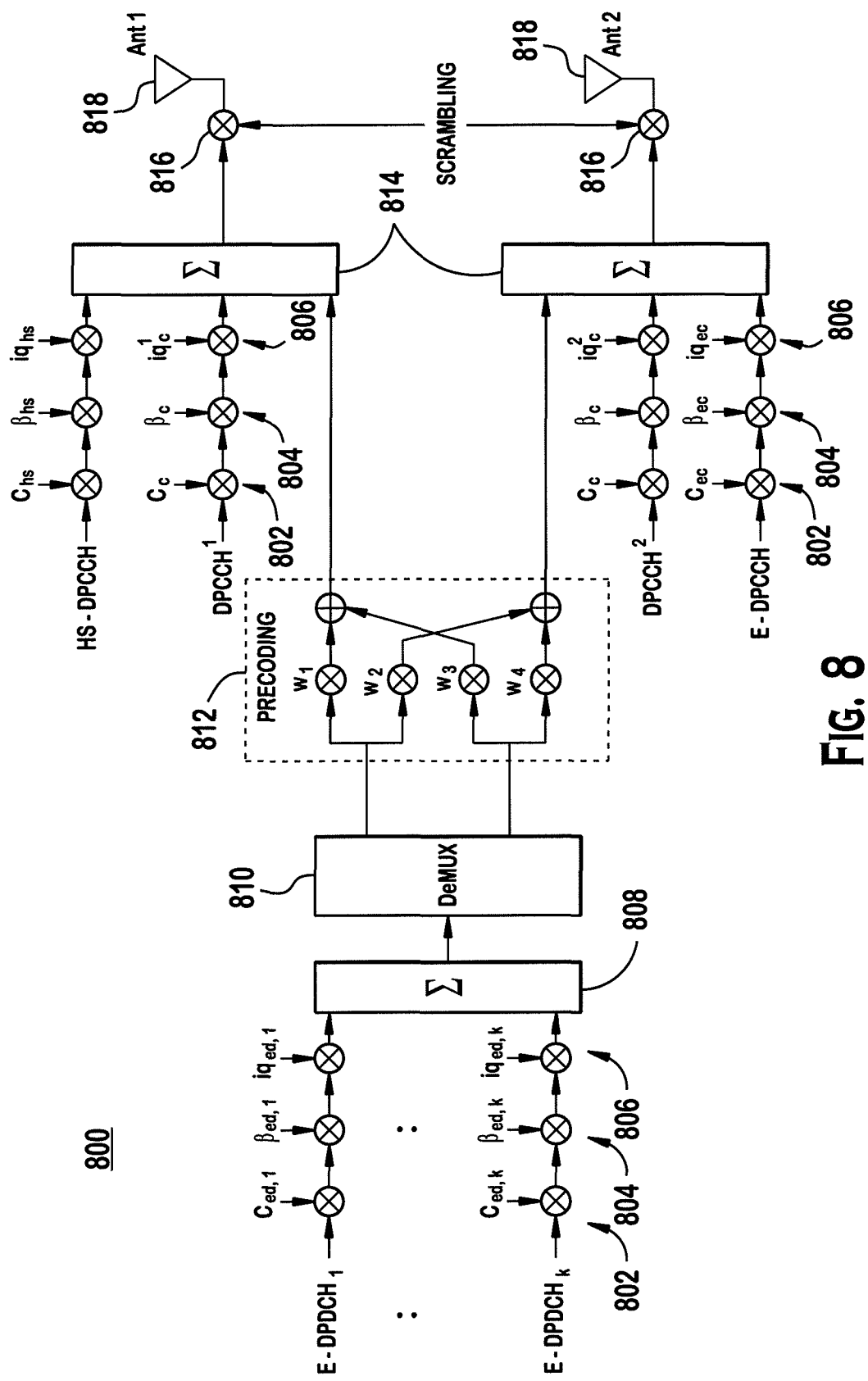
FIG. 8 shows an example transmitter for single codeword spatial multiplexing in accordance with one embodiment.

Instead of dual codeword spatial multiplexing, a transmitter may implement single codeword spatial multiplexing, wherein a single E-DCH codeword is transmitted via two transmit antennas. FIG. 8 shows an example transmitter 800 for single codeword spatial multiplexing in accordance with one embodiment. In this example, it is assumed that no DPDCH is transmitted when the WTRU UL is configured in MIMO mode, two DPCCHs share the same channelization code, and the pilots in the two DPCCHs are orthogonal to each other. It should be noted that this assumption is just for illustration purpose, and any configuration may be applied, (e.g., DPDCH may be simultaneously transmitted, and different channelization codes may be utilized for any of the channels). FIG. 8 shows that the DPCCHs are not pre-coded, but as an alternative, the DPCCHs or any other control channels may also be precoded. One E-DPCCH is transmitted since there is one E-DCH stream.

The transmitter 800, (i.e., WTRU), comprises channelization blocks 802, gain control blocks 804, I/Q mapping blocks 806, channel combiners 808, 814, a demultiplexer 810, a precoding block 812, scrambling blocks 816, and antennas 818. One E-DCH codeword, (i.e., one E-DCH transport block), is mapped to one or more than one E-DPDCH. Each channel, (i.e., E-DPDCH, E-DPCCH, DPCCH, HS-DPCCH), is spread with a corresponding channelization code by a channelization block 802, and multiplied with a corresponding gain factor by a gain control block 804, and mapped to either an I channel or a Q channel by the I/Q mapping block 806. The E-DPDCHs are combined by the channel combiner 808, and demultiplexed to two streams by the demultiplexer 810. The two streams are multiplexed with precoding weights by the precoding block 812 to be distributed to each antenna. The DPCCH, the HS-DPCCH, the E-DPCCH, and the precoded E-DPDCHs are combined by the channel combiner 814 for each antenna. The channel combined signals are multiplied with a scrambling code by the scrambling block 816, and then transmitted via the antennas 818.

As an alternative, the DPCCH and/or the E-DPCCH may also be precoded. When setting a gain factor for the E-DPDCH(s), the temporary variable $\beta_{ed,i,harq}$ calculation may follow the same as the equations (44) and (45), except the value of $\Delta$mimo may not depend on the relative power between two transport blocks as only one transport block is transmitted.

Figure 9:
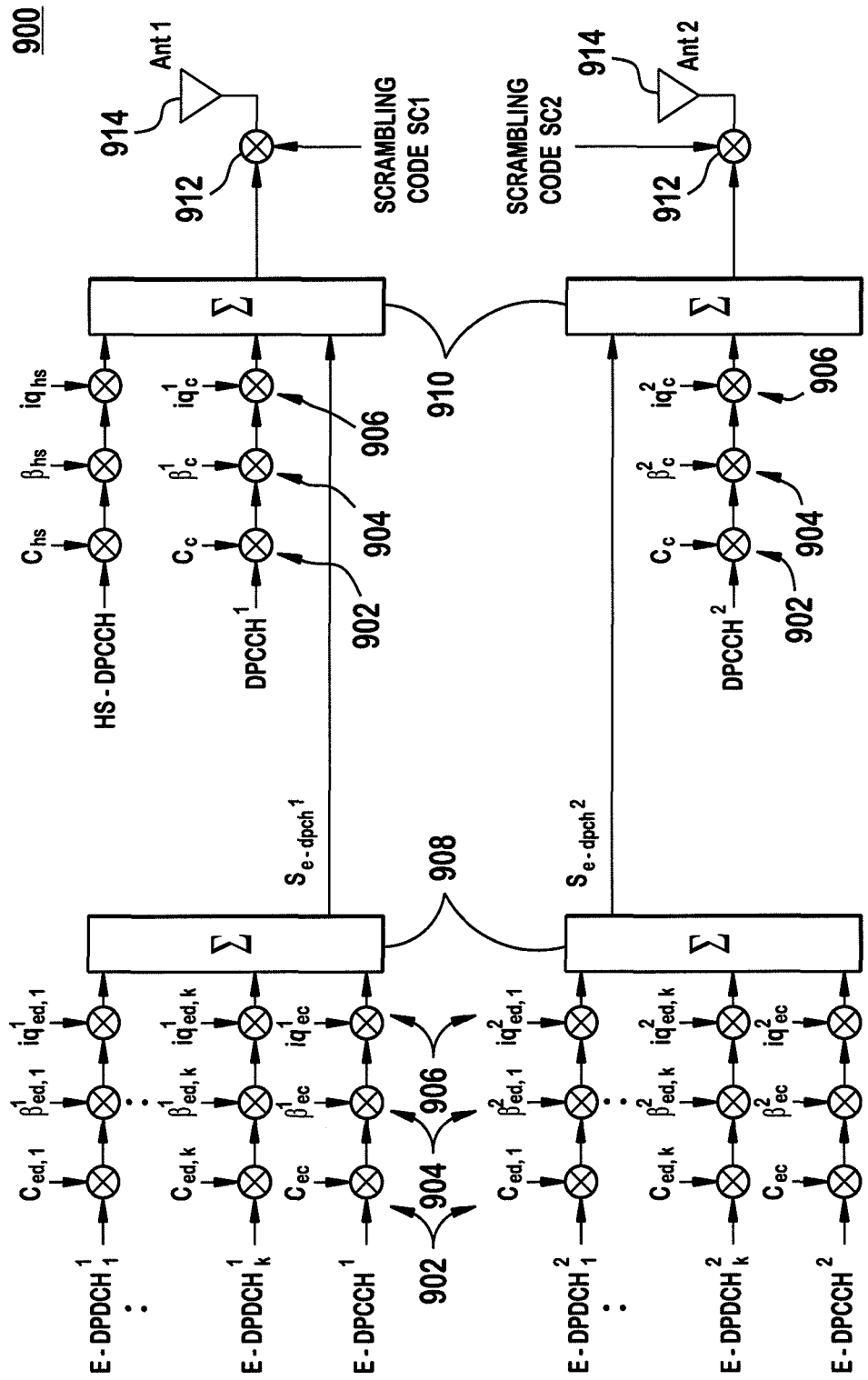
FIG. 9 shows an example transmitter for implementing the pseudo spatial multiplexing scheme in accordance with one embodiment.

In accordance with another embodiment, different scrambling codes may be applied on each antenna without any precoding, (called pseudo spatial multiplexing scheme). FIG. 9 shows an example transmitter 900 for implementing the pseudo spatial multiplexing scheme in accordance with one embodiment.

The transmission scheme in FIG. 9 is not a classical MIMO scheme and there is no need for multiple receive antennas at the base station as the streams can be separated by using the scrambling code. The Node-B receiver may simply treat each WTRU transmit antenna as a virtual user or WTRU. It is noted that multiple receive antennas at the base station with an interference cancellation receiver would provide improved performance for this case. For this transmitter structure, two independent power control loop may be used, one for each virtual user/WTRU.

In this example, it is assumed that no DPDCH is transmitted when the WTRU UL is configured in MIMO mode, two E-DPDCHs in different E-DPDCH streams share the same channelization code, two E-DPCCHs share the same channelization code, two DPCCHs share the same channelization code, and the pilots in the two DPCCHs are orthogonal to each other. It should be noted that this assumption is just for illustration purpose, and any configuration may be applied, (e.g., DPDCH may be simultaneously transmitted, and different channelization codes may be utilized for any of the channels).

The transmitter 900, (i.e., WTRU), comprises channelization blocks 902, gain control blocks 904, I/Q mapping blocks 906, channel combiners 908, 910, scrambling blocks 912, and antennas 914. Two E-DCH codewords, (i.e., two E-DCH transport blocks), may be transmitted simultaneously. Each E-DCH codeword may be mapped to one or more than one E-DPDCH, and an E-DPCCH is transmitted along with each E-DCH codeword. Each channel, (i.e., E-DPDCH, E-DPCCH, DPCCH, HS-DPCCH), is spread with a corresponding channelization code by a channelization block 902, and multiplied with a corresponding gain factor by a gain control block 904, and mapped to either an I channel or a Q channel by the I/Q mapping block 906. The channels are combined by the combiners 908, 910 for each antenna. The channel combined signals are multiplied with a different scrambling code by the scrambling block 912, and then transmitted via the antennas 914.

This may have the advantage of simplifying the infrastructure and scheduling as the different streams may be considered as independent WTRUs. In the embodiment, the additional MIMO power offset may be included to increase the power of the data channel in accordance with equations (44) and (45). A power scaling in accordance with any embodiment disclosed above may be implemented.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

The invention claimed is:
1. A wireless transmit/receive unit (WTRU) comprising:
  circuitry configured to receive configuration information from a cellular network;
  the circuitry is further configured to derive a first hybrid automatic repeat request (HARQ) offset value for single codeword transmission and a second HARQ offset value for multiple codeword transmission from the received configuration information;

the circuitry is further configured to receive a signal from the cellular network; wherein the signal indicates whether the WTRU is to transmit a single codeword or multiple codewords; and the circuitry is further configured in response to the signal and on a condition that HARQ information is to be sent, to process bits of a single codeword based on the first HARQ offset value or process bits of multiple codewords based on the second HARQ offset value.

2. The WTRU of claim 1 wherein on a condition that the WTRU is to transmit multiple codewords and the transmission power level is greater than a maximum power level, the equal power scaling is applied to each antenna so that the transmission power level does not exceed the maximum.

3. The WTRU of claim 1 wherein the circuitry is further configured to receive power control commands and same power control commands are accumulated to determine a transmission power level for single codeword and multiple codeword transmission; wherein the same power control commands are used to determine the transmission power level for each of the multiple codewords.

4. The WTRU of claim 1 wherein the circuitry is configured to use a single power control loop for both single codeword transmission and multiple codeword transmission.

5. A method comprising:
receiving, by a wireless transmit/receive unit (WTRU), configuration information from a cellular network;

deriving, by the WTRU, a first HARQ offset value for single codeword transmission and a second hybrid automatic repeat request (HARQ) offset value for multiple codeword transmission from the received configuration information;

receiving, by the WTRU, a signal from the cellular network; wherein the signal indicates whether the WTRU is to transmit a single codeword or multiple codewords; and in response to the signal and on a condition that HARQ information is to be sent, processing, by the WTRU, bits of a single codeword based on the first HARQ offset value or process bits of multiple codewords based on the second HARQ offset value.

6. The method of claim 5 further comprising on a condition that the WTRU is to transmit multiple codewords and the transmission power level is greater than a maximum power level, applying, by the WTRU, equal power scaling to each antenna so that the transmission power level does not exceed the maximum.

7. The method of claim 5 further comprising receiving power control commands; wherein same power control commands are accumulated to determine a transmission power level for single codeword and multiple codeword transmission; wherein the same power control commands are used to determine the transmission power level for each of the multiple codewords.

8. The method of claim 5 further comprising using a single power control loop for both single codeword transmission and multiple codeword transmission.

9. A wireless network node comprising:
circuitry configured to transmit configuration information to a wireless transmit/receive unit (WTRU); wherein based on the configuration information, the WTRU can derive a first hybrid automatic repeat request (HARQ) offset value for single codeword transmission and a second HARQ offset value for multiple codeword transmission;

the circuitry is further configured to transmit a signal to the WTRU; wherein the signal indicates whether the WTRU is to transmit a single codeword or multiple codewords; and the circuitry is further configured in response to the signal and on a condition that HARQ information is received, to receive a signal from the WTRU having bits processed for a single codeword based on the first HARQ offset value or bits processed for multiple codewords based on the second HARQ offset value.

10. The wireless network node of claim 9 wherein the circuitry is further configured to use a single power control loop for both single codeword transmission and multiple codeword transmission.

* * * * *